United States Patent
Terakawa et al.

(10) Patent No.: US 8,288,033 B2
(45) Date of Patent: Oct. 16, 2012

(54) LAMINATED POROUS FILM, SEPARATOR FOR LITHIUM CELL, AND CELL

(75) Inventors: Toru Terakawa, Nagahama (JP); Miho Yamamoto, Nagahama (JP); Takeyoshi Yamada, Nagahama (JP); Yasushi Usami, Nagahama (JP)

(73) Assignee: Mitsubishi Plastics, Inc., Tokyo (JP)

(*) Notice: Subject to any disclaimer, the term of this patent is extended or adjusted under 35 U.S.C. 154(b) by 0 days.

(21) Appl. No.: 13/128,449

(22) PCT Filed: Nov. 9, 2009

(86) PCT No.: PCT/JP2009/069042
§ 371 (c)(1),
(2), (4) Date: May 10, 2011

(87) PCT Pub. No.: WO2010/053172
PCT Pub. Date: May 14, 2010

(65) Prior Publication Data
US 2011/0217584 A1  Sep. 8, 2011

(30) Foreign Application Priority Data

Nov. 10, 2008 (JP) ................. 2008-287852
Nov. 10, 2008 (JP) ................. 2008-287853

(51) Int. Cl.
*H01M 2/16* (2006.01)
*B32B 27/08* (2006.01)
(52) U.S. Cl. ........................ 429/144; 428/516
(58) Field of Classification Search .......... 429/144; 428/516
See application file for complete search history.

(56) References Cited

U.S. PATENT DOCUMENTS 7,807,287 B2 * 10/2010 Kono et al. ............ 429/144
7,981,536 B2 *  7/2011 Kono et al. ............ 429/144

FOREIGN PATENT DOCUMENTS

| EP | 0 794 583 A1 | 9/1997 |
|----|--------------|--------|
| EP | 1 787 805 A1 | 5/2007 |
| JP | 6 84450 | 10/1994 |
| JP | 2509030 | 6/1996 |
| JP | 10 50286 | 2/1998 |
| JP | 2001 138455 | 5/2001 |
| JP | 2003 103624 | 4/2003 |
| JP | 3443934 | 9/2003 |

(Continued)

OTHER PUBLICATIONS

Decision to Grant a Patent mailed Apr. 5, 2011 in Japanese Patent Application No. 2008-287853 filed Nov. 10, 2008 (w/English Translation and Certification Statement).

(Continued)

*Primary Examiner* — Stephen J. Kalafut
(74) *Attorney, Agent, or Firm* — Oblon, Spivak, McClelland, Maier & Neustadt, L.L.P.

(57) ABSTRACT

Provided is a laminated porous film having excellent shutdown characteristics and breakdown characteristics, good tearing strength and dimensional stability, and B activity. The laminated porous film comprises layer A, the main component of which is a polypropylene resin, and layer B which contains a polyethylene resin, and the ratio of the rearing strength ($H_{MD}$) in the machine direction (MD) of the laminated porous film and the tearing strength ($H_{TD}$) in the transverse direction (TD) of the laminated porous film with respect to the machine direction ($H_{MD}$) ($H_{TD}$) is 0.08 to 2.0.

20 Claims, 2 Drawing Sheets

FOREIGN PATENT DOCUMENTS

JP 3852492 11/2006
JP 2007 238822 9/2007

OTHER PUBLICATIONS

Decision to Grant a Patent mailed Apr. 5, 2011 in Japanese Patent Application No. 2008-287852 filed Nov. 10, 2008 (w/English Translation and Certification Statement).

U.S. Appl. No. 13/213,122, filed Aug. 19, 2011, Usami, et al.
International Search Report issued Feb. 16, 2010 in PCT/JP09/69042 filed Nov. 9, 2009.
Extended European Search Report issued Mar. 7, 2012, in European Patent Application No. 09824869.3.
U.S. Appl. No. 13/378,107, filed Dec. 14, 2011, Yamada, et al.

* cited by examiner

LAMINATED POROUS FILM, SEPARATOR FOR LITHIUM CELL, AND CELL

TECHNICAL FIELD

The present invention relates to a laminated porous film and more particularly to a laminated porous film which can be utilized as a separator for a battery, packing supplies, hygiene products, livestock supplies, agricultural supplies, building supplies, medical supplies, separation films, light diffusing plates, reflective sheets, and preferably utilized as a separator for a nonaqueous electrolyte secondary battery such as a lithium secondary battery to be utilized power supplies of various electronics.

BACKGROUND ART

A polymeric porous material having a large number of pores intercommunicable with each other is utilized in various fields. For example, the polymeric porous material is utilized to produce ultrapure water, purify chemicals, and as a separation film to be used for water treatment, a waterproof breathable film to be used for clothes and sanitary materials, and a separator of a battery.

A secondary battery is widely used as the power source of OA, FA, household appliances, and portable devices such as communication instruments. A lithium-ion secondary battery has a favorable volumetric efficiency when it is mounted on apparatuses and allows the apparatuses to be compact and lightweight. Therefore there is an increase in the use of portable devices in which the lithium-ion secondary battery is mounted.

Owing to research and development of a large secondary battery which has been made in the field of load leveling, UPS, an electric car, and in many fields relating to the problem of energy and environment, the large secondary battery is allowed to have a large capacity, a high output, a high voltage, and an excellent long-term storage stability. Therefore the lithium-ion secondary battery which is a kind of the nonaqueous electrolyte secondary battery has widely spread in its use.

The lithium-ion secondary battery is so designed that the upper limit of the working voltage thereof is usually 4.1V to 4.2V. Because electrolysis occurs in an aqueous solution at such a high voltage, the aqueous solution cannot be used as an electrolyte. Therefore as an electrolyte capable of withstanding a high voltage, a so-called nonaqueous electrolyte in which an organic solvent is used is adopted.

As a solvent for the nonaqueous electrolyte, an organic solvent having a high permittivity which allows a large number of lithium ions to be present is widely used. Organic carbonate ester such as polypropylene carbonate or ethylene carbonate is mainly used as the organic solvent having a high permittivity. As a supporting electrolyte serving as the ion source of the lithium ion in the solvent, an electrolyte having a high reactivity such as lithium phosphate hexafluoride is used in the solvent by melting it therein.

A separator is interposed between the positive electrode of the lithium-ion secondary battery and its negative electrode to prevent an internal short circuit from occurring. Needless to say, the separator is demanded to have insulating performance as its role. In addition the separator is required to have a porous structure so that it has air permeability to allow the movement of the lithium ion and a function of diffusing and holding the electrolyte. To satisfy these demands, a porous film is used as the separator.

Because batteries having a high capacity are used recently, the degree of importance for the safety of the battery has increased.

A shut-down property (hereinafter referred to as SD property) contributes to the safety of the separator for the battery. The SD property has the function of closing pores when the battery has a high temperature of 100° C. to 140° C., thus cutting ion conduction inside the battery, whereby the temperature inside the battery can be prevented from rising. To use the porous film as the separator for the battery, it is necessary for the porous film to have the SD property.

As another property contributing to the safety of the separator for the battery, a break-down property (hereinafter referred to as BD property) is known. The BD property has a function of preventing the film from being broken and keeping the positive electrode and the negative electrode separated from each other even when generated heat does not drop and the temperature of the battery becomes high (not less than 160° C.). The BD property allows insulation to be maintained even at a high temperature and prevents a wide range of short circuit from occurring between the electrodes, thereby preventing the occurrence of an accident such as firing caused by an abnormal heat generation of the battery. Therefore to use the porous film as the separator for the battery, it is preferable for the porous film to have the BD property. It is also preferable that a break-down temperature (hereinafter referred to as "BD temperature") is as high as possible.

The "BD temperature" means the lowest temperature of temperatures at which the laminated porous film of the present invention is broken when it is heated by placing it in a frame.

In order for the laminated porous film to obtain excellent BD property, dimensional stability at the time of a temperature rise is one of important properties demanded for a battery. When a battery generates heat abnormally, there is a fear that owing to breakage of the separator caused by heat shrinkage, both poles have a short circuit, which may cause the battery to further generate heat. Thus further improvement for heat resistance is demanded.

In order for the laminated porous film to obtain excellent SD property, it is desirable that the laminated porous film has a proper degree of shrinkage factor at temperatures around 100 degrees. This is contradictory to the dimensional stability. Therefore it is very important to take a balance between the shrinkage factor and the SD property.

To comply with the above-described demands, in Japanese Patent Application Laid-Open No. 2003-103624, there is proposed the porous film having a preferable dimensional stability at 105° C. The porous film is obtained by kneading ultra-high-molecular-weight polyethylene and a solvent to form it into a sheet, stretching it, and extracting the solvent.

In U.S. Pat. No. 3,852,492 (patent document 2), there is disclosed the method of producing the separator for the battery consisting of the polyethylene film and the polypropylene film. With the polyethylene film and the polypropylene film being layered one upon another, the film consisting of the layered polyethylene and polypropylene films are stretched in one axial direction at two stages by changing temperature to make the film porous.

Various methods of obtaining porous films by stretching a polypropylene sheet containing β crystal have been proposed. As the characteristic of the method of producing the porous film, the porous structure is obtained by utilizing the β crystal. To obtain the porous structure by stretching the sheet, it is preferable that the sheet contains a lot of the β crystal before the sheet is stretched. This method is a biaxial stretching method and has a very high productivity as a method of obtaining the porous film.

For example, in U.S. Pat. No. 1,953,202 (patent document 3), there is proposed the method of producing the porous sheet by forming the resin composition composed of polypropylene containing a predetermined amount of the filler and the β crystal nucleating agent into a sheet and stretching the sheet at a specific stretching condition. In U.S. Pat. No. 2,509,030 (patent document 4), there is proposed the micro-porous film, made of very transparent polypropylene, which is obtained by biaxially stretching the original polypropylene film having a high (K>0.5) β crystal content rate. In U.S. Pat. No. 3,443,934 (patent document 5), there is proposed the method of producing the porous sheet by crystallizing polypropylene containing a particular amide compound in a specific condition to obtain the solidified material and stretching the solidified material.

PRIOR ART DOCUMENT

Patent Document

Patent document 1: Japanese Patent Application Laid-Open No. 2003-103624
Patent document 2: U.S. Pat. No. 3,852,492
Patent document 3: U.S. Pat. No. 1,953,202
Patent document 4: U.S. Pat. No. 2,509,030
Patent document 5: U.S. Pat. No. 3,443,934

SUMMARY OF THE INVENTION

Problem to be Solved by the Invention

But the porous film produced by the production method disclosed in the patent document 1 has a high thermal shrinkage factor at temperatures higher than a pore closure temperature. Thus as disclosed in the U.S. Pat. No. 3,307,231, the porous film has a high shrinkage factor at high temperatures, for example, 150° C. Thus it cannot be said that the porous film has a sufficient dimensional stability.

In addition, in the above-described method, because the solvent contained in the entire porous film is removed by cleaning it with the organic solvent for cleaning use, a large amount of the organic solvent is required, which is unpreferable from the environmental point of view.

The production method disclosed in the patent document requires a strict control for production conditions. In addition it cannot be said that the productivity is good. For example, at the step of forming the film layers to be laminated one upon another before the laminated film is made porous, a high construction is controlled at a high draft ratio. It is very difficult to stably form the laminated film at such a high draft ratio. To generate a porous structure, it is necessary to perform multistage stretching at two stages of a low-temperature region and a high-temperature region and at a low stretching speed. Thus the stretching speed is limited greatly and thus production method has a very low productivity.

In addition the separator produced by the above-described method has a problem that because the separator is produced by uniaxial stretching in a flow direction of the film, the separator has an unfavorable dimensional stability and is very weak when it is torn in a direction perpendicular to the flow direction thereof and is liable to crack in the flow direction thereof.

These polypropylene porous films disclosed in the patent documents 3 through 5 are superior to a polyethylene porous film in the BD property because the crystal melting temperature of polypropylene is high. But owing to the above-described property, the polypropylene porous films are incapable of displaying the SD property. Therefore the polypropylene porous films have a problem that the use thereof as the separator for the battery does not ensure the safety of the battery.

The present invention has been made to solve the above-described problem. Therefore it is a first object of the present invention to provide a laminated porous film which is restrained from being torn in secondary processing and favorably balanced in mechanical properties.

It is a second object of the present invention to provide a laminated porous film which has thermal shrinkage factors balanced favorably, ensured dimensional stability, and excellent shut-down property.

Means for Solving the Problem

To solve the above-described first problem, the first invention provides a laminated porous film having a layer A containing polypropylene resin as a main component thereof and a layer B containing polyethylene resin,
the laminated porous film having a β activity,
wherein a ratio ($H_{MD}/H_{TD}$) of a tear strength ($H_{MD}$) in a flow direction (MD) of the laminated porous film to a tear strength ($H_{TD}$) in a direction (TD) vertical to the flow direction (MD) is 0.08 to 2.0.

It is preferable that the laminated porous film of the first invention has the following properties.
a) A tear strength $H_{MD}$ is not less than 4.5N/cm.
b) A ratio ($T_{MD}/T_{TD}$) of a tensile strength ($T_{MD}$) in the flow direction (MD) of the laminated porous film to a tensile strength ($T_{TD}$) in the direction (TD) vertical to the flow direction (MD) is 0.5 to 10.
c) The tensile strength $T_{TD}$ is not less than 30 MPa.
d) When the laminated porous film is stretched by 3% in the flow direction (MD) of the laminated porous film, a tensile modulus of elasticity thereof is not less than 500 MPa.

The laminated porous film of the first invention is excellent in an SD property and a BD property and has properties effective for a separator of a lithium battery. Particularly the laminated porous film can be restrained from tearing in secondary processability and has physical properties balanced favorably.

To solve the above-described second problem, the second invention provides a laminated porous film having a layer A containing polypropylene resin as a main component thereof and a layer B containing polyethylene resin,
the laminated porous film having a β activity,
wherein when the laminated porous film is heated at 105° C. for one hour in a direction (TD) vertical to a flow direction (MD) of the laminated porous film, a shrinkage factor $S_{TD2}$ is not more than 10%; and
when the laminated porous film is heated at 105° C. for one hour in the flow direction (MD) and in the direction (TD) vertical to the flow direction, a ratio of a shrinkage factor $S_{MD2}$ in the flow direction (MD) to a shrinkage factor $S_{TD2}$ in the direction (TD) vertical to the flow direction (MD) is 0.1 to 3.0.

It is preferable that the laminated porous film of the second invention has the following properties.
e) When the laminated porous film is heated at 40° C. for one hour in the direction (TD) vertical to the flow direction (MD), a shrinkage factor $S_{TD1}$ thereof is less than 1%.

f) When the laminated porous film is heated at 150° C. for one hour in the direction (TD) vertical to the flow direction (MD), a shrinkage factor $S_{TD3}$ thereof is not more than 25%.

g) When the laminated porous film is heated at 40° C. for one hour in the flow direction (MD), a shrinkage factor $S_{MD1}$ thereof is less than 1%; and when the laminated porous film is heated at 105° C. for one hour in the flow direction (MD), a shrinkage factor $S_{MD2}$ thereof is not more than 10%.

h) When the laminated porous film is heated at 150° C. for one hour in the flow direction (MD), a shrinkage factor $S_{MD3}$ thereof is not more than 18%.

i) A ratio of a molecular orientation $O_{MD}$ found from a wide-angle X-ray diffraction measurement in the flow direction (MD) to a molecular orientation $O_{TD}$ found from the wide-angle X-ray diffraction measurement in the direction (TD) vertical to the flow direction (MD) is not less than five.

Similarly to the laminated porous film of the first invention, the laminated porous film of the second invention is excellent in the SD property and the BD property and has properties effective for the separator of the lithium battery. Particularly the laminated porous film has thermal shrinkage factors balanced favorably and thus ensured dimensional stability and is excellent in its shut-down property.

Because the laminated porous films of the first and second inventions have the β activity in at least one layer thereof, the laminated porous films can be provided with a fine porous layer and is thus capable of displaying excellent an air-permeable property.

It is preferable that the laminated porous films of the first and second inventions have the β activity owing to the addition of a β crystal nucleating agent to a resin composition of the layer A. It is also preferable that the layer A obtains the β activity owing to the addition of the β crystal nucleating agent to the polypropylene resin. It is also preferable that 0.0001 to 5.0 parts by mass of the β crystal nucleating agent is added to 100 parts by mass of the polypropylene resin.

When a crystal melting peak temperature derived from the β crystal is detected by a differential scanning calorimeter described later or when a diffraction peak derived from the β crystal is detected by a wide-angle X-ray diffraction measuring apparatus described later, it is judged that the laminated porous film has the β activity.

The β activity is measured in the state of the laminated porous film in the case where the laminated porous film of the present invention consists of the layers A and B and in the case where the laminated porous film is composed of the layers A and B and other porous layers.

In the laminated porous films of the first and second inventions, the layer B contains the polyethylene resin and has the shut-down temperature (hereinafter referred to as SD temperature) lower than that of the layer A.

In the present invention, "SD temperature" means the lowest temperature of temperatures at which pores close. More specifically, the SD temperature means the lowest temperature of temperatures at which the air permeability of the laminated porous film after the laminated porous film is heated becomes not less than 10 times larger than the air permeability thereof before the laminated porous film is heated, when the laminated porous film is heated by the method of the present invention.

It is preferable that the layer B contains at least one kind selected from modified polyolefin resin, alicyclic saturated hydrocarbon resin or modified substances thereof, ethylene copolymers, and wax.

It is preferable that a porosity is 10 to 80%, that an air permeability at 25° C. is 10 to 1000 seconds/100 ml; and that when the laminated porous film is heated at 135° C. for five seconds, an air permeability thereof is not less than 10000 seconds/100 ml.

The third invention provides a separator for a lithium-ion battery consisting of the laminated porous film of the first invention or the second invention.

The fourth invention provides a battery in which the separator for the lithium-ion battery is incorporated.

Effect of the Invention

As described above, the laminated porous films of the first and second inventions are composed of at least two porous layers layered one upon another. One of the two porous layers is the layer A containing the polypropylene resin as its main component. The other of the two porous layers is the layer B containing the polyethylene resin. Therefore the laminated porous films maintain the BD property of the conventional laminated porous film made of the polypropylene resin and has the SD property of closing pores in a proper temperature range.

In addition, because the laminated porous film of the present invention has the β activity, it has pores and is capable of securely obtaining a sufficient intercommunicable performance. Because the layer A is capable of holding a sufficient strength, the laminated porous film is excellent in its mechanical strength such as its pin puncture strength and tear strength. Therefore the laminated porous film is useful as the separator for a lithium-ion battery from the standpoint of the maintenance of its construction and impact resistance.

Particularly the laminated porous film of the first invention has well-balanced properties effective for the tear strength. The shrinkage factors of the laminated porous film of the second invention are controlled in a favorable balance at high temperatures. Thus the laminated porous film of the second invention is excellent in its dimensional stability.

BEST MODE FOR CARRYING OUT THE INVENTION

Figure 1:
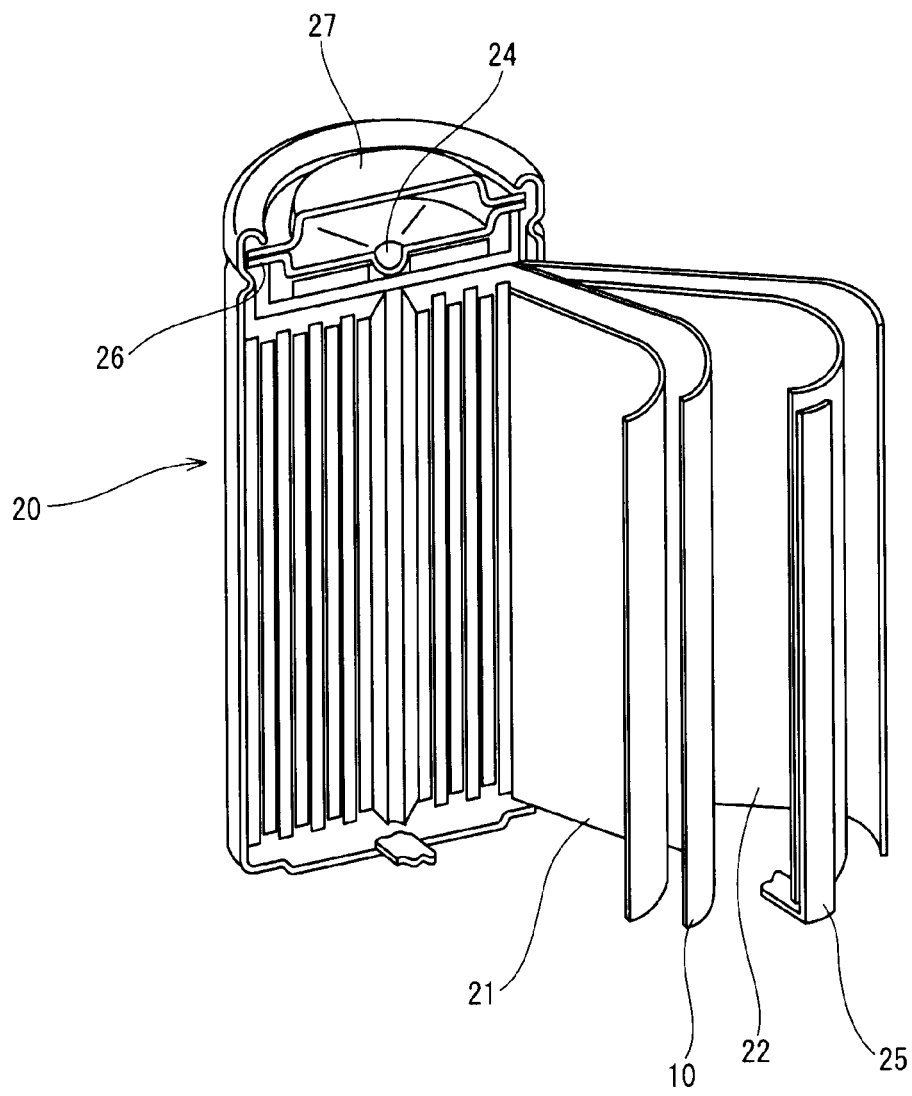
FIG. 1 is a partly cut-out perspective view of a lithium-ion battery accommodating a separator of the present invention for the lithium-ion battery.

The embodiments of the laminated porous film of the present invention are described in detail below.

Initially the embodiment of the laminated porous film of the first invention is described below.

The main constituent feature of the laminated porous film of the first invention and that of the laminated porous film of the second invention are similar to each other. Therefore unless the constituent feature is described specifically as that of the laminated porous film of the first invention or that of the laminated porous film of the second invention in the description made below, the laminated porous film of the first invention and that of the second invention have the constituent feature in common.

Unless specifically described, the expression of "main component" in the description made below includes a case in which a resin composition contains components other than the main component in a range where the function of the main component is not inhibited. Although the content ratio of the main component is not specified, the expression of "main component" also includes a case in which the main component is contained the resin composition at not less than 50 mass %, favorably not less than 70 mass %, and especially favorably not less than 90 mass % (including 100%).

Unless otherwise described, the description of "X to Y" (X, Y are any numbers) is intended to mean "not less than X nor more than Y" and also includes the intention of "it is preferable that Z (subject) is larger than X and smaller than Y".

The laminated porous film of this embodiment has at least two porous layers layered one upon another. One of the two porous layers is a layer A containing polypropylene resin as its main component. The other of the two porous layers is a layer B containing polyethylene resin as its main component. The laminated porous film has β activity.

An important characteristic of the laminated porous film of the present invention is that they have the β activity.

The β activity can be considered as an index indicating that the polypropylene resin in a membrane material generates β crystal before the membrane material is stretched. When the polypropylene resin in the membrane material generates the β crystal before the membrane material is stretched, pores are formed by stretching the membrane material. Thereby it is possible to obtain the laminated porous film having an air-permeable property.

Whether the laminated porous film has the β activity is judged according to whether a crystal melting peak temperature derived from the β crystal of the polypropylene resin is detected by performing differential thermal analysis of the laminated porous film by using a differential scanning calorimeter.

More specifically after the temperature of the laminated porous film is raised from 25° C. to 240° C. at a heating speed of 10° C./minute, the temperature is held at 240° C. for one minute. After the temperature of the laminated porous film is dropped from 240° C. to 25° C. at a cooling speed of 10° C./minute, the temperature is held at 240° C. for one minute. When the crystal melting peak temperature (Tmβ) derived from the β crystal is detected at re-raising of the temperature of the laminated porous film from 25° C. to 240° C. at the heating speed of 10° C./minute, it is judged that the laminated porous film has the β activity.

The β activity degree of the laminated porous film is computed based on an equation shown below by using a detected crystal melting heat amount (ΔHmα) derived from an α crystal of the polypropylene resin and a detected crystal melting heat amount (ΔHmβ) derived from the β crystal.

$$\beta \text{ activity degree (\%)} = [\Delta Hm\beta/(\Delta Hm\beta + \Delta Hm\alpha)] \times 100$$

For example, in the case of homo-propylene, the β activity degree can be computed from the crystal melting heat amount (ΔHmβ), derived from the β crystal, which is detected mainly in a range not less than 145° C. and less than 160° C. and from the crystal melting heat amount (ΔHmα), derived from the α crystal, which is detected mainly in a range not less than 160° C. nor more than 175° C. In the case of random polypropylene in which ethylene is copolymerized at 1 to 4 mol %, the β activity degree can be computed from the crystal melting heat amount (ΔHmβ), derived from the β crystal, which is detected mainly in a range not less than 120° C. and less than 140° C. and from the crystal melting heat amount (ΔHmα), derived from the α crystal, which is detected mainly in a range not less than 140° C. nor more than 165° C.

It is favorable that the β activity degree of the laminated porous film is high. Specifically the β activity degree of the laminated porous film is favorably not less than 20%, more favorably not less than 40%, and most favorably not less than 60%. When the laminated porous film has the β activity degree not less than 20%, a large amount of the β crystal of the polypropylene can be generated in the membrane material before the membrane material is stretched. Thereby pores fine and homogeneous can be formed by stretching the membrane material. Consequently the obtained laminated porous film has an excellent electrical performance.

The upper limit value of the β activity degree is not limited to a specific value. The higher the β activity degree is, the more effectively the above-described effect is obtained. Therefore it is preferable that the upper limit of the β activity degree is close to 100%.

Whether the laminated porous film has the β activity can be also judged based on a diffraction profile obtained by performing wide-angle X-ray diffraction measurement of the laminated porous film which has undergone specific heat treatment.

In detail, after the laminated porous film is thermally treated at 170 to 190° C. higher than the melting point of the polypropylene resin, it is gradually cooled to carry out the wide-angle X-ray diffraction measurement of the laminated porous film for a separator in which the β crystal has been generated and grown. When a diffraction peak derived from a (300) plane of the β crystal of the polypropylene resin is detected in a range of $2\theta = 16.0°-16.5°$, it is judged that the laminated porous film has the β activity.

Regarding the detail of the β crystal structure of the polypropylene resin and the wide-angle X-ray diffraction measurement, it is possible to refer to Macromol. Chem. 187, 643-652 (1986), Prog. Polym. Sci. Vol. 16, 361-404 (1991), Macromol. Symp. 89, 499-511 (1995), Macromol. Chem. 75, 134 (1964), and reference documents listed in these documents. The method of evaluating the β activity is shown in detail in the examples of the present invention to be described later.

As a method of providing the laminated porous film with the β activity, it is possible to exemplify a method of not adding a substance for accelerating the generation of the α crystal of the polypropylene resin to the resin composition of the layer A, a method of adding polypropylene treated to generate a peroxide radical to the resin composition, as described in U.S. Pat. No. 3,739,481, and a method of adding the β crystal nucleating agent to the resin composition of the layer A.

It is especially preferable to obtain the β activity by adding the β crystal nucleating agent to the resin composition of the layer A. By adding the β crystal nucleating agent to the resin composition of the layer A, it is possible to accelerate the generation of the β crystal of the polypropylene resin homogeneously and efficiently and obtain the laminated porous film provided with the porous layer having the β activity.

The details of the components of each of the layers composing the laminated porous film of the present invention are described below.

[Description of Layer A]

Initially the layer A is described in detail below.

(Description of Polypropylene Resin)

As the polypropylene resin contained in the layer A, it is possible to exemplify random copolymers or block copolymers consisting of homo-propylene (propylene homopolymer) or propylene and α-olefin such as ethylene, 1-butene, 1-pentene, 1-hexene, 1-heptene, 1-octene, 1-nonen or 1-decene. Of the above-described random copolymers or block copolymers, the homo-polypropylene is used more favorably from the standpoint of the mechanical strength of the laminated porous film.

It is favorable to use the polypropylene resin having an isotactic structure pentad fraction (mmmm fraction) showing tacticity at 80 to 99%. It is more favorable to use the polypropylene resin having the isotactic structure pentad fraction at 83 to 99% and most favorable to use the polypropylene resin having the isotactic structure pentad fraction at 85 to 99%. When the isotactic structure pentad fraction is too low, there is a fear that the mechanical strength of the film becomes low. On the other hand, the upper limit of the isotactic structure pentad fraction is specified by the upper limit industrially currently obtained. But when a resin having a higher regularity is developed in the future, there is a possibility that the upper limit of the isotactic structure pentad fraction is altered.

The isotactic structure pentad fraction (mmmm fraction) means a three-dimensional structure in which all of five methyl groups which are side chains branched from a main chain consisting of a carbon-carbon bond composed of arbitrary continuous five propylene units are positioned in the same direction or a ratio thereof. The attribution of a signal in a methyl group region complies with A. Zambelli et al (Marcomolecules 8, 687, (1975)).

It is favorable that a polydispersity (expressed by ratio of weight average molecular weight Mw to number average molecular weight Mn, namely, Mw/Mn) is favorably 1.5 to 10.0. It is more favorable to use the polypropylene resin having the Mw/Mn of 2.0 to 8.0 and most favorable to use the polypropylene resin having the Mw/Mn of 2.0 to 6.0. The smaller the Mw/Mn is, the narrower the molecular-weight distribution is. When the Mw/Mn is less than 1.5, there occurs a problem that extrusion moldability is low, and in addition it is difficult to industrially produce the polypropylene resin. On the other hand, when the Mw/Mn exceeds 10.0, the amount of a low molecular-weight component becomes large. Thereby the mechanical strength of the laminated porous film is liable to deteriorate. The Mw/Mn is obtained by a GPC (gel permeation chromatography) method.

Although the melt flow rate (MFR) of the polypropylene resin is not limited to a specific one, the melt flow rate (MFR) thereof is favorably 0.1 to 15 g/10 minutes and more favorably 0.5 to 10 g/10 minutes. When the MFR is less than 0.1 g/10 minutes, the melt viscosity of the resin is high at a molding time and thus the productivity of the film deteriorates. On the other hand, when the MFR is more than 15 g/10 minutes, the film has a low mechanical strength. Thus a problem is liable to occur in practical use.

The MFR is measured in accordance with JIS K7210 in conditions where temperature is 190° C. and a load is 2.16 kg.

(Description of β Crystal Nucleating Agent)

As the β crystal nucleating agent to be used in the present invention, substances shown below are listed. Provided that the generation and growth of the β crystal is increased, the β crystal nucleating agent is not limited to specific ones. Substances shown below may be used by mixing not less than two kinds thereof with each other.

As the β crystal nucleating agent, it is possible to list amide compounds; tetraoxaspiro compounds; quinacridones; iron oxide having a nano-scale size; alkaline metal salts or alkaline earth metal salts of carboxylic acid represented by 1,2-potassium hydroxystearate, magnesium benzoate, magnesium succinate, and magnesium phthalate; aromatic sulfonic acid compounds represented by sodium benzensulfonate and sodium naphthalene sulfonate; diesters or triesters of dibasic or tribasic carboxylic acid; phthalocyanine-based pigments represented by phthalocyanine blue; two-component compounds composed of a component a which is an organic dibasic acid and a component b which is oxides, hydroxides or salts of the IIA group metals of the Periodic Table; and compositions consisting of a cyclic phosphorous compound and a magnesium compound. Other kinds of the nucleating agents are described in Japanese Patent Application Laid-Open Nos. 2003-306585, 06-289566, and 09-194650.

As examples of the β crystal nucleating agent commercially available, it is possible to exemplify "Enujesuta-NU-100" produced by New Japan Chemical Co., Ltd. As examples of the polypropylene resin to which the β crystal nucleating agent is added, it is possible to list polypropylene "Bepol B-022SP" produced by Aristech Inc., "Beta (β)-PP BE60-7032" produced by Borealis Inc., and polypropylene "BNX BETAPP-LN" produced by Mayzo Inc.

It is necessary to appropriately adjust the mixing ratio of the β crystal nucleating agent to be added to the polypropylene resin according to the kind of the β crystal nucleating agent or the composition of the polypropylene resin. It is favorable to use 0.0001 to 5.0 parts by mass of the β crystal nucleating agent, more favorable to use 0.001 to 3.0 parts by mass thereof, and most favorable to use 0.01 to 1.0 part by mass thereof for 100 parts by mass of the polypropylene resin. When the mixing ratio of the β crystal nucleating agent is not less than 0.0001 parts by mass, it is possible to sufficiently generate and grow the β crystal of the polypropylene resin at a production time and securely obtain the β activity to a sufficient degree. Thereby the obtained laminated porous film is capable securely obtaining the β activity to a sufficient degree, thus obtaining desired air-permeable performance. The addition of the β crystal nucleating agent not more than 5.0 parts by mass to 100 parts by mass of the polypropylene resin is economically advantageous and in addition, prevents the β crystal nucleating agent from bleeding to the surface of the film, which is preferable.

It is important that the layer A contains the polypropylene resin as its main component. When the polypropylene resin and the β crystal nucleating agent are used, the total of the mass of the polypropylene resin and that of the β crystal nucleating agent is set to not less than 70 mass %, favorably not less than 80 mass %, and more favorably not less than 90 mass % for the whole mass of the layer A.

The layer A may contain additives or other components to be normally contained in the resin composition, provided that the mixing amount thereof is in a range in which they do not inhibit the above-described object of the present invention and the properties of the layer A. The additives are added to the resin to improve and adjust molding processability, productivity, and various properties of the laminated porous film. It is possible to list recycle resin which is generated from trimming loss such as a lug, inorganic particles such as silica, talc, kaolin, calcium carbonate, and the like, pigments such as titanium oxide, carbon black, and the like, a flame retardant, a weathering stabilizer, a heat stabilizer, an antistatic agent, a melt viscosity improving agent, a crosslinking agent, a lubricant, a nucleating agent, plasticizer, an age resistor, an antioxidant, a light stabilizer, an ultraviolet ray absorber, a neutralizing agent, an antifog agent, an anti-blocking agent, a slip agent, and a coloring agent. Specifically as the antioxidant, copper halide, amine-based antioxidants such as aromatic amine, and phenolic antioxidants such as triethylene glycol bis[3-(3-t-butyl-5-methyl-4-hydroxyphenyl)propionate. As an antioxidant commercially available, "IRGANOXB225" (produced by Chiba Specialty Chemicals, Inc.). In addition, additives commercially available, the ultraviolet ray absorber described on pages 178 through 182 of "Formulation for Plastics", a surface active agent serving as the antistatic agent described on pages 271 through 275 thereof, the lubricant described on pages 283 through 294 thereof.

[Description of Layer B]

The layer B is described below.

(Description of Polyethylene Resin)

The layer B of the present invention is characterized in that it contains the polyethylene resin. The layer B may have any constructions, provided that it has a large number of pores intercommunicable with each other in the thickness direction thereof and is composed of a composition containing the polyethylene resin as its component, as described above. For example, the layer B may have a structure having the pores formed in a membrane material made of a polyethylene resin composition or may have a structure in which particulate or fibrous micro-substances aggregate to form a layer and gaps between the micro-substances form the pores. It is preferable that the layer B of the present invention has the former structure which allows uniform pores to be formed and the porosity and the like to be easily controlled.

The thermal property of the polyethylene resin contained in the layer B is important. That is, it is necessary to so select the polyethylene resin that the crystal melting peak temperature of the composition composing the layer B is lower than that of the composition composing the layer A. Specifically, it is preferable that the layer B contains the polyethylene resin whose crystal melting peak temperature is not less than 100° C. nor more than 150° C.

The crystal melting peak temperature is a peak value of the crystal melting temperature detected when the temperature of the layer B is increased from 25° C. at a heating speed of 10° C./minute in accordance with JIS K7121 by using a differential scanning calorimeter.

As the kind of the polyethylene resin, it is possible to list polyolefin resin such as ultra-low-density polyethylene, low-density polyethylene, linear low-density polyethylene, intermediate-density polyethylene, high-density polyethylene, and ultra-high-density polyethylene and in addition, an ethylene-propylene copolymer, and mixtures of the polyethylene resin and polyolefin resins. Of these polyethylene resins, it is preferable to use the polyolefin resin alone.

The density of the polyethylene resin is set to favorably 0.910 to 0.970 g/cm$^3$, more favorably 0.930 to 0.970 g/cm$^3$, and most favorably 0.940 to 0.970 g/cm$^3$. When the density thereof is not less than 0.910 g/cm$^3$ in using the laminated porous film as the separator of the lithium-ion battery, it is possible to form the layer B having a proper SD property, which is preferable. On the other hand, when the density is not more than 0.970 g/cm$^3$, the layer B has a proper SD property and in addition maintains stretchability, which is preferable. The density can be measured by using a density gradient tube method in accordance with JIS K7112.

Although the melt flow rate (MFR) of the polyethylene resin is not specifically limited, the melt flow rate thereof is set to favorably 0.03 to 15 g/10 minutes and more favorably 0.3 to 10 g/10 minutes. When the MFR is not less than 0.03 g/10 minutes, it is possible to obtain a stable laminated porous film at a molding processing time because the melt flow rate of the polyethylene resin is close to the melt viscosity of the polypropylene resin. On the other hand, when the MFR is not more than 15 g/10 minutes, the melt viscosity of the resin is sufficiently low at the molding processing time, which is preferable in production.

The method of producing the polyethylene resin is not limited to a specific one, but it is possible to exemplify known polymerization method using a known olefin polymerization catalyst, for example, polymerization methods using a multi-site catalyst represented by a Ziegler-Natta type catalyst and a single-site catalyst represented by a Metallocene catalyst.

(Description of Compound (X))

It is favorable that the layer B contains a substance which accelerates the formation of the porous layer B. Above all, it is more favorable that the layer B contains at least one compound (X) selected from among modified polyolefin resin, alicyclic saturated hydrocarbon resin or modified substances thereof, ethylene copolymers, and wax. By adding the compound (X) to the polyethylene resin, it is possible to obtain a porous structure more efficiently and easily control the configurations of pores and the diameter thereof.

In the present invention, the modified polyolefin resin means resin containing polyolefin modified with unsaturated carboxylic acid, anhydrides thereof or a silane coupling agent as its main component. As the unsaturated carboxylic acid and the anhydrides thereof, acrylic acid, methacrylic acid, maleic acid, maleic anhydride, citraconic acid, citraconic anhydride, itaconic acid, itaconic anhydride, ester compounds of monoepoxy compounds of derivatives of these acids and these acids, and reaction products of these acids and polymers having groups capable of reacting with these acids are listed. It is also possible to use metal salts of these substances. The maleic anhydride is used more favorably than these substances. It is possible to use these copolymers singly or by mixing not less than two kinds thereof with each other.

As the silane coupling agent, it is possible to list vinyl triethoxysilane, methacryloyloxytrimethoxysilane, and γ-methacryloyloxypropyltriacetyloxysilane.

To produce the modified polyethylene resin, for example, it is possible to copolymerize these monomers for modification with a polymer at the stage of polymerizing the polymer or graft-copolymerize the polymerized polymer with these monomers for modification. One or a plurality of the monomers for modification is used to modify the polyolefin resin. The modified polyethylene resins having not less than 0.1 mass % nor more than 5 mass % are preferably used. Of these modified polyethylene resins, graft-modified ones are preferably used.

As the modified polyolefin resins commercially available, "ADMER" (produced by Mitsui Chemicals, Inc.) and "Modick" (produced by Mitsubishi Chemical Corporation) are exemplified.

As the alicyclic saturated hydrocarbon resin and modified substances thereof, petroleum resin, rosin resin, terpene resin, coumarone resin, indene resin, coumarone-indene resin, and modified substances thereof.

In the present invention, the petroleum resin means aliphatic, aromatic, and copolymerization petroleum resins to be obtained by homo-polymerization or copolymerization of one or not less than two kinds of aliphatic olefins or olefins, having C4 to C10, which are obtained from side products resulting from thermal decomposition of naphtha or aromatic compounds having not less than C8 and olefinically unsaturated bond.

The petroleum resin includes the aliphatic petroleum resin whose main raw material is C5 fraction, the aromatic petroleum resin whose main raw material is C9 fraction, and the copolymerization petroleum resin of the aliphatic petroleum resin and the aromatic petroleum resin, and alicyclic petroleum resin. As the terpene resin, it is possible to exemplify terpene resin and terpene-phenol resin to be obtained from β-pinene. As the rosin resin, it is possible to exemplify rosin resin such as gum rosin, wood rosin, and the like and esterified rosin resin modified with glycerin or pentaerythritol. When alicyclic saturated hydrocarbon resin and modified substances thereof are mixed with the polyethylene resin, they show a comparatively favorable compatibility with the polyethylene resin. The petroleum resin is more favorable from the standpoint of color and thermal stability. To use the hydrogenated petroleum resin is more favorable.

The hydrogenated petroleum resin is obtained by hydrogenating the petroleum resin by conventional methods. For example, hydrogenated aliphatic petroleum resin, hydrogenated aromatic petroleum resin, hydrogenated copolymerization petroleum resin, hydrogenated alicyclic petroleum resin, and hydrogenated terpene resin are listed. Of the hydrogenated petroleum resin, the hydrogenated alicyclic petroleum resin obtained by copolymerizing a cyclopentadiene compound and an aromatic vinyl compound with each other is especially preferable. As the hydrogenated petroleum resin commercially available, "Archon" (produced by Arakawa Chemical Industries, Ltd.) is exemplified.

In the present invention, the ethylene copolymers mean compounds obtained by copolymerizing ethylene with not less than one kind selected from among vinyl acetate, unsaturated carboxylic acid, unsaturated carboxylic acid anhydride, and carboxylic acid ester.

In the ethylene copolymer, the content ratio of an ethylene monomer unit is favorably not less than 50 parts by mass, more favorably not less than 60 parts by mass, and most favorably not less than 65 parts by mass. As the upper limit of the content ratio of the ethylene monomer unit is favorably not more than 95 parts by mass, more favorably not more than 90 parts by mass, and most favorably not more than 85 parts by mass. When the content ratio of the ethylene monomer unit is within the predetermined range, it is possible to form the porous structure more efficiently.

The ethylene copolymer having the MFR not less than 0.1 g/10 minutes nor more than 10 g/10 minutes is preferably used. When the MFR is more than 0.1 g/10 minutes, extrusion processability can be favorably maintained. When the MFR is less than 10 g/10 minutes, the strength of the film is unlikely to deteriorate, which is preferable.

The ethylene copolymers shown below can be commercially obtained. As an ethylene-vinyl acetate copolymer, "EVAFLEX" (produced by Dupont-Mitsui Polychemicals Co., Ltd.) and "Novatec EVA" (produced by Japan Polyethylene Corporation) are exemplified. As an ethylene-acrylic acid copolymer, "NUC copolymer" (produced by Nippon Unicar Co., Ltd.), "EVAFLEX-EAA" (produced by Dupont-Mitsui Polychemicals Co., Ltd.), and "REXPEARL EAA" (produced by Japan Ethylene Corporation) are exemplified. As an ethylene-(metha)acrylate copolymer, "ELVALOY" (produced by Dupont-Mitsui Polychemicals Co., Ltd.) and "REXPEARL EMA" (produced by Japan Ethylene Corporation) are exemplified. As an ethylene-ethyl acrylate, "REXPEARL EEA" (produced by Japan Ethylene Corporation) is exemplified. As an ethylene-methyl(metha)acrylate copolymer, "Acryft" (produced by Sumitomo Chemical Co., Ltd.) is exemplified. As an ethylene-vinyl acetate-maleic anhydride terpolymer, "Bondine" (produced by Sumitomo Chemical Co., Ltd.) is exemplified. As an ethylene-glycidyl methacrylate copolymer, an ethylene-vinyl acetate-glycidyl methacrylate terpolymer, and ethyl-ethyl acrylate-glycidyl methacrylate terpolymer, "Bondfast" (produced by Sumitomo Chemical Co., Ltd.) is exemplified.

In the present invention, the wax is organic compounds satisfying the properties of the following (a) and (b).

(a) Melting point is 40° C. to 200° C.

(b) Melt viscosity at temperature higher than the melting point by 10° C. is not more than 50 Pa·s.

The wax includes polar wax or nonpolar wax, polypropylene wax, polyethylene wax, and wax modifier. More specifically the polar wax, the nonpolar wax, Fischer-Tropsh wax, oxidized Fischer-Tropsh wax, hydroxystearamide wax, functionalized wax, the polypropylene wax, the polyethylene wax, the wax modifier, amorphous wax, carnauba wax, caster oil wax, microcrystalline wax, beeswax, castor wax, vegetable wax, candelilla wax, Japan wax, ouricury wax, douglas-fir bark wax, rice bran wax, jojoba wax, bayberry wax, montan wax, ozokerite wax, ceresin wax, petroleum wax, paraffin wax, chemically modified hydrocarbon wax, substituted amide wax, combinations of these wax, and derivatives thereof. Of these waxes, the paraffin wax, the polyethylene wax, and the microcrystalline wax are favorable because these waxes allow the porous structure to be formed efficiently. The microcrystalline wax is more favorable because it allows pore diameters to be small, which is preferable to efficiently work the SD property. As the polyethylene wax commercially available, "FT-115" (produced by Nippon Seiro Co., Ltd.) is exemplified. As the microcrystalline wax, "Hi-Mic" (produced by Nippon Seiro Co., Ltd.) is exemplified.

In using the compound (X) as the separator for the lithium-ion battery, as the compounds (X) which allow the SD property to work more efficiently, the alicyclic saturated hydrocarbon resin or the modified substances thereof, the ethylene copolymers, and the wax are favorable. The wax is more favorable from the standpoint of moldability.

In forming pores by peeling the interface of the polyethylene resin and the compound (X), the mixing amount of the compound (X) for 100 parts by mass of the polyethylene resin contained in the layer B is favorably not less than one part by mass, more favorably not less than five parts by mass, and most favorably not less than 10 parts by mass. On the other hand, as the upper limit of the mixing amount of the compound (X), the mixing amount thereof is favorably not more than 50 parts by mass, more favorably not more than 40 parts by mass, and most favorably not more than 30 parts by mass. By setting the mixing amount of the compound (X) for 100 parts by mass of the polyethylene resin to not less than one part by mass, it is possible to obtain a sufficient effect of forming a desired favorable porous structure. By setting the mixing amount of the compound (X) for 100 parts by mass of the polyethylene resin to not more than 50 parts by mass, it is possible to secure a more stable moldability.

In the layer B, in addition to the polyethylene resin and the compound (X) for accelerating the formation of pores, thermoplastic resin may be used in a range where the thermal property of the laminated porous film, specifically the SD property is not inhibited. As other thermoplastic resins which can be mixed with the polyethylene resin, styrene resin such as styrene, AS resin, ABS resin, and PMMA resin; ester resin such as polyvinyl chloride resin, fluorine resin, polyethylene terephthalate, polybutylene terephthalate, polycarbonate, and polyarylate; ether resin such as polyacetal, polyphenylene ether, polysulfone, polyether sulfone, polyether ether ketone, and polyphenylene sulfide; and polyamide resin such as nylon 6, nylon 6-6, and nylon 6-12 are listed.

The layer B may contain a rubber component such as a thermoplastic elastomer as necessary. As the thermoplastic elastomer, it is possible to list styrene butadiene, polyolefin, urethane, polyester, polyamide, 1,2-polybutadiene, polyvinyl chloride, and ionomer thermoplastic elastomers.

In addition to the polyethylene resin and the compound (X) accelerating the formation of pores, the layer B may contain additives or other components to be normally contained in the resin composition. The additives are used for the layer B to improve and adjust molding processability, productivity, and various properties of the laminated porous film. It is possible to list recycle resin generated from trimming loss such as a lug, inorganic particles such as silica, talc, kaolin, calcium carbonate, and the like, pigments such as titanium oxide, carbon black, and the like, a flame retardant, a weathering stabilizer, a heat stabilizer, an antistatic agent, a melt viscosity improving agent, a crosslinking agent, a lubricant, a nucleating agent, a plasticizer, an age resistor, an antioxidant, a light stabilizer, an ultraviolet ray absorber, a neutralizing agent, an antifog agent, an anti-blocking agent, a slip agent, and a coloring agent.

Of the above-described additives, the nucleating agent is preferable because it has the effect of controlling the crystal structure of the polyethylene resin and making the porous structure fine when the layer B is stretched to form pores. As examples of the additives commercially available, "GEL ALL D" (produced by New Japan Science Ltd.), "ADK STAB" (produced by Asahi Denka Co., Ltd.), "Hyperform" (produced by Milliken & Company), and "IRGACLEAR D" (produced by Chiba Specialty Chemicals, Inc.) are listed. As an example of the polyethylene resin to which the nucleating agent is added, "RIKEMASTER CN" (produced by Riken Vitamin Co., Ltd.) is exemplified.

[Description of Laminated Construction]

The laminated construction of the laminated porous film of the present invention is described below.

The laminated construction is not limited to a specific one, provided that the layer A and the layer B constructing the basic construction of the laminated porous film are present. The simplest laminated construction is a two-layer construction consisting of the layer A and the layer B. The second simplest laminated construction is a two-kind three-layer construction consisting of two outer layers and an intermediate layer. These two constructions are preferable. In the case of the two-kind three-layer construction, the layer A/the layer B/the layer A and the layer B/the layer A/the layer B can be adopted. If necessary, it is possible to form a three-kind three-layer construction by combining a layer having other function with the layer A and the layer B. It is also possible to increase the number of layers if necessary. For example, four-layer, five-layer, six-layer, and seven-layer constructions can be adopted.

The ratio of the thickness of the layer A to that of the layer B is set to favorably 0.05 to 20, more favorably 0.1 to 15, and most favorably 0.5 to 12. By setting the value of the layer A/the layer B to not less 0.05, the layer A is capable of sufficiently displaying the BD property and strength. By setting the value of the layer A/the layer B to not more than 20, when the laminated porous film is applied to a battery, the SD property can be sufficiently displayed and thus the safety of the battery can be ensured. When layers other than the layer A and the layer B are formed, the ratio of the total of the thicknesses of the other layers to the entire thickness of the laminated porous film is favorably 0.05 to 0.5 and more favorably 0.1 to 0.3, supposing that the entire thickness of the laminated porous film is 1.

[Description of Configuration and Property of Laminated Porous Film]

Although the form of the laminated porous film may be flat or tubular, the flat shape is more favorable than the tubular shape because the former allows several products to be obtained from one sheet. Therefore the former provides a high productivity and allows the inner surface of the sheet to be coated.

The thickness of the laminated porous film of the present invention is favorably not more than 50 μm, more favorably not more than 40 μm, and most favorably not more than 30 μm. On the other hand, as the lower limit of the thickness thereof, the thickness thereof is not less than 5 μm, more favorably not less than 10 μm, and most favorably not less than 15 μm. In using the laminated porous film as the separator for the lithium-ion battery, when the thickness of the laminated porous film is not more than 50 μm, it is possible to set the electric resistance of the laminated porous film low because it is possible to sufficiently display the air-permeable property of the laminated porous film, which ensures a sufficient performance of the battery. When the thickness of the laminated porous film is not less than 5 μm, it is possible for the laminated porous film to maintain a strength necessary when it is used as the separator for the lithium-ion battery and obtain a substantially necessary electrical insulating performance. Thus when a high voltage is applied to the battery, short circuit is unlikely to occur. Therefore the battery is excellent in safety.

The properties of the laminated porous film of the present invention can be freely adjusted according to the composition of the layer A or that of layer B, the number of layers, the ratio among the thicknesses of layers to be layered, the combination of the layers A and B and other layers having properties other than those of the layers A and B, and a production method.

As the lower limit of the SD temperature of the laminated porous film of the present invention, the SD temperature thereof is favorably not less than 100° C., more favorably not less than 110° C., and most favorably not less than 120° C. On the other hand, as the lower limit of the SD temperature thereof, the SD temperature thereof is not more than 140° C. Supposing that the SD property is displayed at not more than 100° C., when the laminated porous film of the present invention is used as the separator for the lithium-ion battery and when the battery is left in a car in summer, there is a possibility that the temperature of the battery becomes close to 100° C. in dependence on a place. It is unpreferable that the battery does not function in this state. On the other hand, when the SD temperature of the laminated porous film is higher than 140° C., the SD temperatures in this range is insufficient for securing the safety of the battery.

As means for adjusting the SD temperature, it is effective to use a means for selecting thermoplastic resin having the crystal melting peak temperature close to the desired SD temperature as the thermoplastic resin to be contained in the layer B and a means for increasing the thickness ratio of the layer B.

(Air Permeability at 25° C.)

The air permeability of the laminated porous film of the present invention at 25° C. is favorably not more than 1000 seconds/100 ml, more favorably not more than 950 seconds/100 ml, and most favorably not more than 900 seconds/100 ml. By setting the air permeability thereof at 25° C. to not more than 1000 seconds/100 ml, when the laminated porous film is used as the separator for the lithium-ion battery, the lithium-ion battery is capable of having an excellent performance when it is used at a room temperature.

That the air permeability of the laminated porous film at 25° C. is low means that when it is used as the separator for the lithium-ion battery, charge transfer can be easily accomplished, and the battery has an excellent performance, which is preferable. Although the lower limit of the air permeability of the laminated porous film is not limited to a specific value, the air permeability thereof is favorably not less than 10 seconds/100 ml, more favorably not less than 50 seconds/100 ml, and most favorably not less than 100 seconds/100 ml. When the air permeability of the laminated porous film at 25° C. is not less than 10 seconds/100 ml, it is possible to prevent the occurrence of trouble such as an internal short circuit from occurring when the laminated porous film is used as the separator for the lithium-ion battery.

(Air Permeability after Heating for Five Seconds at 135° C.)

It is important that the laminated porous film of the present invention displays the SD property when it is used as the separator for the lithium-ion battery. Specifically when the air permeability of the laminated porous film is measured after it is heated for five seconds at 135° C., the air permeability thereof is favorably not less than 10000 seconds/100 ml, more favorably not less than 25000 seconds/100 ml, and most favorably not less than 50000 seconds/100 ml. By setting the air permeability thereof to not less than 10000 seconds/100 ml after it is heated for five seconds at 135° C., pores close promptly when heat is abnormally generated, and thus electric current is shut off. Thus it is possible to prevent the occurrence of trouble of the battery such as rupture.

The SD property depends on the porosity and the pore diameter. For example, it is possible to control the air permeability of the laminated porous film after the laminated porous film is heated at 135° C. for five seconds by adding the compound (X) to the polyethylene resin and adjusting the kind and mixing amount thereof or by adding the nucleating agent to the polyethylene resin to make the crystal of the polyethylene resin fine, although operations for controlling the air permeability of the laminated porous film are not limited to those described above.

By adjusting a stretching ratio, a stretching temperature or a relaxation condition in a production method, it is possible to set the air permeability of the laminated porous film to not less than 10000 seconds/100 ml after the laminated porous film is heated at 135° C. for five seconds.

The porosity is an important factor for specifying the porous structure and is a numerical value indicating the ratio of a spatial portion in the film. The porosity of the laminated porous film of the present invention is favorably not less than 15%, more favorably not less than 20%, most favorably not less than 30%, and especially favorably not less than 40%. On the other hand, as the upper limit of the porosity, the porosity is favorably not more than 80%, more favorably not more than 70%, most favorably not more than 65%. When the porosity is more than 15%, the laminated porous film securely obtains sufficient intercommunicable performance and is thus excellent in its air-permeable property. When the porosity is less than 80%, the laminated porous film is capable of sufficiently holding its sufficient mechanical strength, which is preferable from the standpoint of handling.

In the laminated porous film of the present invention, the balance between the mechanical property thereof in a flow direction (hereinafter referred to as "MD") thereof and the mechanical property in a direction vertical (hereinafter referred to as "TD") to the flow direction thereof is important.

Generally the balance in the mechanical property of the laminated porous film produced by stretching the porous film is greatly changed according to a production method.

For example, in the case of the porous film produced by so stretching that it is strongly oriented in the MD, the porous film is excellent in its tensile modulus of elasticity and tensile strength in the MD, whereas the porous film is often inferior in its tear strength in the MD and in its tensile strength in the TD. On the other hand, in the case of the porous film produced by so stretching that it is strongly oriented in the TD, the porous film is excellent in its tensile modulus of elasticity and tensile strength in the TD, whereas it is often inferior in its tear strength in the TD and in its tensile strength in the MD.

When the porous film is stretched biaxially in the MD and the TD, the mechanical property thereof also changes greatly in dependence on the stretching ration and the stretching temperature in the MD and the TD.

In the porous film having various preferable mechanical properties, it is important that the ratio ($H_{MD}/H_{TD}$) of a tear strength ($H_{MD}$) in the MD to a tear strength ($H_{TD}$) in the TD is 0.080 to 2.0.

By setting the ratio $H_{MD}/H_{TD}$ to not less than 0.080, it is possible to restrain the porous film from easily tearing in the MD. Thus it is possible to restrain the porous film from tearing in secondary processing in the MD and from tearing in the MD when it contacts a projection. In addition the porous film can be easily cut in the TD with cutlery such as a cutter. The ratio $H_{MD}/H_{TD}$ is favorably not less than 0.10 and more favorably not less than 0.13.

By setting the ratio $H_{MD}/H_{TD}$ to not more than 2.0, it is possible to keep the mechanical property of the porous film in the MD and that in the TD balanced sufficiently and isotropically form the porous structure, and further it is possible to obtain a sufficiently high tensile modulus of elasticity in the MD. Thus the film is unlikely to be stretched by a tension applied thereto when the film is unwound from a roll, which is preferable in performing the secondary processing. The ratio $H_{MD}/H_{TD}$ is set to favorably not more than 1.5, more favorably not more than 1.0, and most favorably not more than 0.5.

The $H_{MD}$ is set to favorably not less than 4.5N/cm and more favorably not less than 5.5N/cm. By setting the $H_{MD}$ to not less than 4.5N/cm, it is possible to restrain the porous film from easily tearing in the MD. Although the upper limit of the $H_{MD}$ is not specified, the $H_{MD}$ should be so selected that the ratio $H_{MD}/H_{TD}$ does not fall out of the above-described range.

It is favorable to set the ratio ($T_{MD}/T_{TD}$) of a tensile strength ($T_{MD}$) in the MD to a tensile strength ($T_{TD}$) in the TD to 0.5 to 10.

By setting the ratio $T_{MD}/T_{TD}$ to not less than 0.5, it is possible to keep the mechanical property in the MD and that in the TD balanced, isotropically form the porous structure, and obtain a sufficiently high tensile modulus of elasticity in the MD. The ratio $T_{MD}/T_{TD}$ is set to more favorably not less than 1.0 and most favorably not more than 2.0.

By setting the ratio $T_{MD}/T_{TD}$ to not more than 10, it is possible to sufficiently restrain the porous film from easily tearing in the MD. The ratio $T_{MD}/T_{TD}$ is set to more favorably not more than 4.5 and most favorably not more than 3.0.

The $T_{TD}$ is set to favorably not less than 30 MPa and more favorably not less than 35 MPa. By setting the $T_{TD}$ to not less than 30 MPa, the laminated porous film has a sufficient strength in handleability. Although the upper limit of the $T_{TD}$ is not specified, it is preferable that the $T_{TD}$ should be so selected that the ratio $T_{MD}/T_{TD}$ does not fall out of the above-described range.

In the laminated porous film of the present invention, the mechanical property in the MD is important in handling it. The tensile modulus of elasticity thereof when it is stretched by 3% in the MD is set to favorably not less than 500 MPa and more favorably not less than 700 MPa.

By setting the tensile modulus of elasticity thereof when it is stretched by 3% in the MD to 500 MPa, the laminated porous film has a small amount of tension-caused deformation in the secondary processing and is thus unlikely to be bend or wrinkled. Although the upper limit of the tensile modulus of elasticity thereof when it is stretched by 3% in the MD is not limited to a specific value, the tensile modulus of elasticity thereof is set to not more than 6000 MPa because in the range, the properties such as the flexibility of the laminated porous film can be sufficiently retained.

It is preferable to obtain the laminated porous film of the present invention by biaxial stretching. The biaxial stretching decreases anisotropy. Thereby it is possible to obtain the laminated porous film having physical properties balanced sufficiently.

Other properties of the laminated porous film of the present invention can be also freely adjusted according to the compositions of the resin compositions composing the layers A and B, the construction of the layers, and the production method.

[Description of Production Method]

The method of producing the laminated porous film of the present invention is described below. The present invention is not limited to the laminated porous film produced by the production method described below.

The method of producing the laminated porous film of the present invention is classified into the following three methods according to the order in making the laminated porous film porous and the order in layering the layers.

(a) A method of forming a porous film of the layer A (hereinafter referred to as "porous film PP") containing the polypropylene resin as its main component and a porous film of the layer B (hereinafter referred to as "porous film PE") containing the polyethylene resin and thereafter layering at least the porous film PP and the porous film PE one upon another.

(b) A method of forming a laminated membrane material composed of at least two layers consisting of a membrane material (hereinafter referred to as "unporous membrane material PP") containing the polypropylene resin as its main component and a membrane material (hereinafter referred to as "unporous membrane material PE") containing the polyethylene resin as its main component and thereafter making the laminated unporous membrane material porous.

(c) A method of making the layer A containing the polypropylene resin as its main component or the layer B containing the polyethylene resin porous, layering the porous layer A and the unporous membrane material B on each other or layering the unporous layer A and the porous membrane material B on each other, and thereafter making the unporous membrane material A or B porous.

As the method (a), it is possible to exemplify a method of laminating the porous film PP and the porous film PE one upon another and a method of layering the porous film PP and the porous film PE one upon another with an adhesive agent.

As the method (b), it is possible to exemplify a method of forming the unporous membrane material PP and the unporous membrane material PE, and thereafter layering the unporous membrane material PP and the unporous membrane material PE one upon another by lamination or with an adhesive agent, and thereafter making both unporous membrane materials porous. Alternatively it is possible to exemplify a method of forming the laminated unporous membrane material by carrying out co-extrusion, and thereafter making the unporous membrane material porous.

As the method (c), it is possible to exemplify a method of laminating the porous film PP and the unporous membrane material PE one upon another or laminating the unporous membrane material PP and the porous film PE one upon another and a method of layering the porous film PP and the unporous membrane material PE one upon another or the unporous membrane material PP and the porous film PE one upon another with an adhesive agent. In the present invention, the method (b) is favorable and particularly the method of using the co-extrusion is more favorable in the method (b) from the standpoint of the simplicity of production steps and a high productivity.

Separately from the above-described classification, the method of producing the laminated porous film of the present invention can be also classified by the method of making the layer B porous.

That is, when the layer A has the β activity, pores can be easily formed by stretching the layer A. As the method of making the layer B porous, it is possible to use known methods such as a stretching method, a phase separation method, an extraction method, a chemical treatment method, an irradiation etching method, a fusion method, a foaming method, and methods to be carried out in combination of these techniques. In the present invention, it is most favorable to use the stretching method.

The stretching method means a method of forming the unporous layer or the unporous membrane material by using a composition composed of resin and a compound added thereto and peeling the interface of the resin and the compound by stretching the unporous layer or the unporous membrane material to form pores. In the phase separation method also called a conversion method or a micro-phase separation method, the pores are formed based on a phase separation phenomenon of a solution of a high polymer molecule. Specifically the phase separation method is classified into (a) a method of forming the pores by the phase separation of the high polymer molecule and (b) a method of making the layer B porous while the pores are being formed at a polymerization time. The former method is classified into a solvent gel method using a solvent and a thermal melting rapid solidification method. Both methods can be used.

In the extraction method, an additive removable in a post process is mixed with the thermoplastic resin composition composing the layer B to form the unporous layer or the unporous membrane material. Thereafter the additive is extracted with a chemical to form the pores. As the additive, a polymeric additive, an organic additive, and an inorganic additive are listed.

As an example of the extraction method in which the polymeric additive is used, it is possible to exemplify a method of forming the unporous layer or the unporous membrane material by using two kinds of polymers different from each other in the solubility in an organic solvent and immersing the unporous layer or the unporous membrane material in the organic solvent in which one of the two kinds of polymers dissolves to extract one of the two kinds of polymers. More specifically it is possible to exemplify a method of forming the unporous layer or the unporous membrane material consisting of polyvinyl alcohol and polyvinyl acetate and extracting the polyvinyl acetate by using acetone and n-hexane, and a method of containing a hydrophilic polymer in a block copolymer or a graft copolymer to form the unporous layer or the unporous membrane material and removing the hydrophilic polymer by using water.

As an example of the extraction method in which the organic additive is used, it is possible to exemplify a method of adding a substance to an organic solvent in which the substance is soluble but the thermoplastic resin composing the layer B is insoluble to form the unporous layer or the unporous membrane material and immersing the unporous layer or the unporous membrane material in the organic solvent to remove the substance by extraction.

As the above-described substance, it is possible to list higher aliphatic alcohol such as stearyl alcohol and seryl alcohol; n-alkanes such as n-decane and n-dodecane; paraffin wax; liquid paraffin; and kerosene. These substances can be extracted with the organic solvent such as isopropanol, ethanol, and hexane. As the above-described substance, water-soluble substances such as sucrose, sugar, and the like are listed. Because these water-soluble substances can be extracted with water, they impose burden on environment to a low extent.

In the chemical treatment method, pores are formed by chemically cutting bonds at a portion of a polymeric substrate or performing a bonding reaction. More specifically, methods of forming pores by performing chemical treatment such as redox treatment, alkali treatment, and acid treatment are exemplified.

In the irradiation etching method, pores are formed by irradiating the polymeric substrate with neutron rays or laser.

In the fusion method, fine polymer powder such as powder of polytetrafluoroethylene, polyethylene or polypropylene is sintered after molding finishes.

As the foaming method, a mechanical foaming method, a physical foaming method, and a chemical foaming method are known. In the present invention, any of the above-described methods can be used.

As a favorable form of producing the laminated porous film of the present invention, it is possible to exemplify a method of forming the laminated unporous membrane material composed at least two layers, namely, the layer A and the layer B by using the resin composition containing the polypropylene resin as its main component and having the β activity and the resin composition containing the polypropylene resin and the compound (X) and stretching the laminated unporous membrane material to form a large number of pores intercommunicable with each other in the thickness direction thereof.

The method of producing the laminated unporous membrane material is not limited to a specific method, but known methods may be used. It is possible to exemplify a method of fusing the thermoplastic resin composition by using an extruder, co-extruding it from a T-die, and cooling it with a cast roll to solidify it. It is also possible to use a method of cutting open a film produced by using a tubular method to make it planar.

The method of stretching the laminated unporous membrane material includes a roll stretching method, a rolling process, a tenter stretching method, and a simultaneous biaxial stretching method. It is preferable to perform biaxial stretching by using one of the above-described methods or in combination of not less than two of the above-described methods.

As an example, description is made below on a method of producing the laminated porous film having a two-kind three-layer construction by performing a T-die co-extrusion by using the resin composition, containing the polypropylene resin as its main component and having the β activity, which composes the layer A and the resin composition, containing the polypropylene resin and the compound (X), which composes the layer B and biaxially stretching the obtained laminated unporous membrane material.

It is preferable that the resin composition composing the layer A contains at least the polypropylene resin and the β crystal nucleating agent. It is preferable to mix these components with each other with a Henschel mixer, a super mixer or a tumbler-type mixer. Alternatively all components are put in a bag and mixed with each other by hand. Thereafter the components are fused and kneaded with a uniaxial extruder, a twin screw extruder or a kneader to pelletize the components. It is preferable to use the twin screw extruder.

In forming the resin composition composing the layer B, the components thereof including the polyethylene resin, the compound (X), and desired additives shown in the description of the layer B are mixed with one another with the Henschel mixer, the super mixer or the tumbler-type mixer. Thereafter the components are fused and kneaded with the uniaxial extruder, the twin screw extruder or the kneader to pelletize the components. It is preferable to use the twin screw extruder.

The pellet of the resin composition for the layer A and the pellet of the resin composition for the layer B are supplied to the extruder to extrude them from a co-extrusion mouthpiece of a T-die. As the kind of the T-die to be used, both a two-kind three-layer multi-manifold type and a two-kind three-layer feed block type can be used.

Although the gap of the T-die to be used is determined according to an ultimately necessary thickness of a film, a stretching condition, a draft ratio, and various conditions, the gap of the T-die is set to normally 0.1 to 3.0 mm and favorably 0.5 to 1.0 mm. It is unpreferable to set the gap of the T-die to less than 0.1 mm from the standpoint of a production speed. When the gap of the T-die is more than 3.0 mm, the draft ratio becomes large, which is not preferable from the standpoint of stability in the production of the film.

Although the extrusion processing temperature in the extrusion molding is appropriately adjusted according to the flow property of the resin composition and the moldability thereof, the extrusion processing temperature is set to favorably 150 to 300° C. and more favorably 180 to 280° C. When the extrusion processing temperature is more than 150° C., the fused resin has a sufficiently low viscosity and thus an excellent moldability is obtained, which is preferable. When the extrusion processing temperature is less than 300° C., it is possible to restrain the resin composition from deteriorating.

The temperature at which the membrane material is cooled to solidify it is very important in the present invention. At temperatures shown below, the β crystal in the unstretched membrane material is generated and grown, and the ratio of the β crystal in the membrane material can be adjusted. The temperature at which the membrane material is cooled to solidify it by means of the cast roll is set to favorably 80 to 150° C., more favorably 90 to 140° C., and most favorably 100 to 130° C. By setting the temperature at which the membrane material is cooled to solidify it to not less than 80° C., the ratio of the β crystal in the membrane material solidified by cooling it can be sufficiently increased, which is preferable. By setting the temperature at which the membrane material is cooled to solidify it to not more than 150° C., it is possible to prevent the occurrence of trouble that extruded fused resin adheres to the cast roll and sticks to it and thus efficiently process the resin composition into the membrane material, which is preferable.

By setting the temperature of the cast roll to the above-described temperature range, it is favorable to adjust the ratio of the β crystal of the unstretched membrane material to 30 to 100%. The ratio of the β crystal is set to more favorably 40 to 100%, most favorably 50 to 100%, and especially favorably 60 to 100%. By setting the ratio of the β crystal of the unstretched membrane material to not less than 30%, it is easy to make the membrane material porous by a stretching operation to be performed at a subsequent production step. Thereby it is possible to obtain the porous film having an excellent air-permeable property.

The ratio of the β crystal is computed based on the following equation by using a crystal melting heat amount ($\Delta Hm\alpha$) derived from the α crystal of the polypropylene and the crystal melting heat amount ($\Delta Hm\beta$) derived from the β crystal detected, when the temperature of the membrane material is raised from 25° C. to 240° C. at a heating speed of 10° C./minute by using the differential scanning calorimeter.

Ratio of β crystal (%) = $[\Delta Hm\beta/(\Delta Hm\beta + \Delta Hm\alpha)] \times 100$ Thereafter the obtained laminated unporous membrane material is biaxially stretched. Simultaneous biaxial stretching or sequential biaxial stretching is performed. In forming the laminated porous film superior in its SD property intended by the present invention, it is possible to select a stretching condition at each stretching step. In the present invention, the sequential biaxial stretching capable of easily controlling the porous structure is preferable. Stretching in a membrane material pick-up direction (MD) (flow direction) is called "vertical stretching", whereas stretching in a direction (TD) vertical to the MD is called "horizontal stretching".

In using the sequential biaxial stretching, the vertical stretching ratio is set to favorably 2 to 10, more favorably 3 to 8, and most favorably 3 to 7. By performing the vertical stretching at a ratio not less than two, it is possible to generate a proper starting point of pores. By performing the vertical stretching at a ratio not more than 10, it is possible to generate a proper starting point of pores.

Although it is necessary to select a stretching temperature according to the composition, crystal melting peak temperature, and crystallization degree of a resin composition to be used, the stretching temperature in the vertical stretching is set to 0 to 135° C. and favorably 15 to 130° C. The above-described temperature range allows the porous structure to be easily controlled and the balance among physical properties such as the mechanical strength and shrinkage factor to be easily taken.

When the stretching temperature in the vertical stretching is set below 0° C., a stretching stress becomes very high. Thus stretch fracture is liable to occur. In vertically stretching the unstretched membrane material with a roll, the adhesion between the roll and the unstretched membrane material is bad. Thus uneven stretch is liable to occur. On the other hand, when the stretching temperature in the vertical stretching exceeds 135° C., it is difficult to stably stretch the unstretched membrane material because the polyethylene resin in the layer B flows.

The stretching ratio in the horizontal stretching is set to favorably 1.1 to 10, more favorably 1.2 to 8, and most favorably 1.4 to 7. By horizontally stretching the unstretched membrane material in the above-described range, it is possible to moderately enlarge the starting point of pores formed by the vertical stretching, generate a fine porous structure, and easily take a balance among the physical properties.

The stretching temperature in the horizontal stretching is set to 80 to 150° C. and favorably 90 to 140° C. By horizontally stretching the unstretched membrane material in the above-described range, it is possible to moderately enlarge the starting point of the pores formed by the vertical stretching and generate a fine porous structure. The stretching speed at the horizontal stretching step is set to favorably 500 to 12000%/minute, more favorably 1500 to 10000%/minute, and most favorably 2500 to 8000%/minute.

The stretching ratio of the stretching ratio in the vertical stretching to the stretching ratio in the horizontal stretching is set to favorably not less than 1.0, more favorably not less than 1.2, and most favorably not less than 1.5. As the lower limit of the stretching ratio in the vertical stretching to the stretching ratio in the horizontal stretching, the stretching ratio is favorably not more than 2.5, more favorably not more than 2.4, and most favorably not more than 2.2. By adjusting the stretching ratio in the vertical stretching to the stretching ratio in the horizontal stretching in the above-described range, it is possible to obtain the laminated porous film having a favorable balance between the tear strength thereof in the flow direction thereof and the tear strength thereof in the direction vertical to the flow direction thereof.

The laminated porous film obtained in the above-described manner is heat-treated at favorably 100 to 150° C. and more favorably at 110 to 140° C. to improve the dimensional stability thereof. Relaxation treatment may be performed as necessary at a rate of 1 to 25% during the heat treatment step. By uniformly cooling the laminated porous film after the heat treatment is carried out and thereafter winding it, the laminated porous film of the present invention is obtained.

[Description of Separator for Battery]

A nonaqueous electrolyte battery accommodating the laminated porous film of the present invention as its separator is described below with reference to FIG. 1.

Both a positive plate 21 and a negative plate 22 are spirally wound by overlapping the positive plate 21 and the negative plate 22 on each other via a separator 10. The outer sides of the positive plate 21 and the negative plate 22 are fixed with a tape to integrate the wound the positive plate 21, the negative plate 22, and the separator 10 with one another. In spirally winding them, the thickness of the separator 10 is set to favorably 5 to 40 µm and especially favorably 5 to 30 µm. By setting the thickness of the separator 10 to not less than 5 µm, the separator 10 is resistant to tear. By setting the thickness of the separator 10 to not more than 40 µm, it is possible to increase the area of the battery in accommodating the wound separator 10 in a predetermined battery can and increase the capacity of the battery.

The positive plate 21, the separator 10, and the negative plate 22 integrally wound is accommodated inside a bottomed cylindrical battery case and welded to a positive lead 24 and a negative lead 25 respectively. Thereafter the electrolyte is injected to the battery can. After the electrolyte penetrates into the separator 10 sufficiently, the periphery of the opening of the battery can is sealed with a positive lid 27 via a gasket 26. Thereafter preparatory charge and aging are carried out to produce the cylindrical nonaqueous electrolyte battery.

A lithium salt is dissolved in an organic solvent to obtain the electrolyte. Although the organic solvent is not limited to a specific one, the following substances are used: esters such as propylene carbonate, ethylene carbonate, butylene carbonate, γ-butyrolactone, γ-valerolactone, dimethyl carbonate, methyl propionate, and butyl acetate; nitriles such as acetonitrile; ethers such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxofuran; and sulfolane. These organic solvents can be used singly or in combination of not less than two kinds thereof. It is preferable to use an electrolyte in which 1.0 mol/L of lithium phosphate hexafluoride ($LiPF_6$) is dissolved in a solvent containing two parts by mass of the methyl ethyl carbonate mixed with one part by mass of the ethylene carbonate.

As the negative electrode, an alkali metal or a compound containing the alkali metal integrated with a current collector such as a net made of stainless steel is used. As the alkali metal, lithium, sodium or potassium is used. As the compound containing the alkali metal, alloys of the alkali metal and aluminum, lead, indium, potassium, cadmium, tin or magnesium; compounds of the alkali metal and a carbon material; and compounds of the alkali metal having a low electric potential and metal oxides or sulfides are listed.

In using the carbon material for the negative electrode, it is possible to use those capable of doping or de-doping lithium ions. For example, it is possible to use graphite, pyrolytically decomposed carbons, cokes, glassy carbons, calcined organic polymeric compounds, mesocarbon microbead, carbon fiber, and activated carbon.

A negative plate produced as follows is used in the first embodiment. A carbon material having an average particle diameter of 10 μm is mixed with a solution in which vinylidene fluoride is dissolved in N-methylpyrrolidone to obtain slurry. After the slurry consisting of the mixture of the above-described substances is passed through a 70-mesh net to remove large particles, the slurry is uniformly applied to both surfaces of a negative electrode current collector consisting of a belt-shaped copper foil having a thickness of 18 μm and is dried. After the slurry is compression-molded with a roll press machine, the molding is cut to obtain the belt-shaped negative plate.

As the positive electrode, metal oxides such as a lithium cobalt oxide, a lithium nickel oxide, a lithium manganese oxide, a manganese dioxide, a vanadium pentoxide or a chromium oxide and metal sulfides such as a molybdenum disulfide are used as an active substance. A conductive assistant and a binding agent such as polytetrafluoroethylene are added to the positive active substance to obtain a combination of these substances. Thereafter the combination of these substances is processed into a molding by using a current collector such as stainless steel net as the core of the positive electrode. The molding formed in this manner is used as the positive electrode.

In the first embodiment, as the positive electrode, a belt-shaped positive plate produced as described below is used. That is, as a conductive assistant, scaly graphite is added to the lithium cobalt oxide ($LiCoO_2$) at a mass ratio of lithium cobalt oxide:scaly graphite=90:5. Both substances are mixed with each other to form a mixture. The mixture and a solution in which the polyvinylidene fluoride is dissolved in the N-methylpyrrolidone are mixed with each other to obtain slurry. After the slurry consisting of the mixture of these substances is passed through the 70-mesh net to remove large particles, the slurry is uniformly applied to both surfaces of a positive current collector consisting of an aluminum foil and dried. After the slurry is compression-molded with the roll press machine, the molding is cut to obtain the belt-shaped positive plate.

EXAMPLES

Description of Examples

Examples and comparison examples are shown below. Although the laminated porous film of the present invention is described below in detail, the present invention is not limited thereto.

Example 1

0.1 mass parts by mass of 3,9-bis[4-(N-cyclohexylcarbamoyl)phenyl]-2,4,8,10-tetraoxaspiro[5.5]undecane was added to 100 parts by mass of polypropylene resin (Prime polypro F300SV produced by Prime Polymer Corporation, MFR: 3 g/10 minutes) as the β crystal nucleating agent. The above-described two components were fused and kneaded at 280° C. by using a same-direction twin screw extruder (produced by Toshiba Machine Co., Ltd., diameter: φ40 mm, screw effective length L/D=32) to obtain a pelletized resin composition A1.

20 parts by mass of hydrogenated petroleum resin (Archon P115 produced by Arakawa Chemical Industries, Ltd.) was added to 80 parts by mass of high-density polyethylene ("Hi-Zex3300F" produced by Prime Polymer Corporation, density: 0.950 g/cm³, MFR: 1.1 g/10 minutes) serving as polyethylene resin. The above-described two components were fused and kneaded at 230° C. by using the same-direction twin screw extruder (produced by Toshiba Machine Co., Ltd., diameter: φ35 mm, screw effective length L/D=32) to obtain a pelletized resin composition B1.

After the resin compositions A1 and B1 were extruded at 200° C. by different extruders, they were extruded from a multi-layer molding T-die through a two-kind three-layer feed block. After the resin compositions A1 and B1 were layered one upon another in such a way that a film thickness ratio of A1/B1/A1 after they were stretched was 2/1/2, they were solidified by cooling them with a casting roll having a temperature of 125° C. to obtain a laminated unporous membrane material.

The laminated unporous membrane material was subjected to sequential biaxial stretching to stretch it 3.8 times longer than its original length in the MD at 110° C. and thereafter 2.5 times longer than its original length in the TD at 105° C. Thereafter the laminated unporous membrane material was subjected to heat relaxation by 14% at 115° C. to obtain a laminated porous film.

Example 2

After the resin compositions A1 and B1 were layered one upon another similarly to the example 1, they were solidified by cooling them with the casting roll having a temperature of 125° C. to obtain a laminated unporous membrane material.

The laminated unporous membrane material was subjected to the sequential biaxial stretching to stretch it 3.8 times longer than its original length in the MD at 110° C. and thereafter 2.5 times longer than its original length in the TD at 100° C. Thereafter the laminated unporous membrane material was subjected to heat relaxation by 14% at 115° C. in the TD to obtain a laminated porous film.

Example 3

60 parts by mass of polypropylene copolymer resin (produced by Sumitomo Chemical Co., Ltd., D101, MFR: 0.5 g/10 minutes) and 0.1 parts by mass of the 3,9-bis[4-(N-cyclohexylcarbamoyl)phenyl]-2,4,8,10-tetraoxaspiro[5.5] undecane serving as the β crystal nucleating agent were added to 40 parts by mass of the polypropylene resin ("Prime polypro" F300SV, MFR: 3 g/10 minutes produced by Prime Polymer Corporation). The above-described three components were fused and kneaded at 280° C. by using the same-direction twin screw extruder (produced by Toshiba Machine Co., Ltd., diameter: 40 mmφ, screw effective length L/D=32) to obtain a pelletized resin composition A2.

10 parts by mass of the hydrogenated petroleum resin (Archon P115 produced by Arakawa Chemical Industries, Ltd.) was added to 90 parts by mass of the high-density polyethylene (Hi-Zex3300F produced by Prime Polymer Corporation, density: 0.950 g/cm³, MFR: 1.1 g/10 minutes) serving as the polyethylene resin. The above-described two components were fused and kneaded at 230° C. by using the same-direction twin screw extruder (produced by Toshiba Machine Co., Ltd., diameter: φ35 mm, screw effective length L/D=32) to obtain a pelletized resin composition B2.

After the resin compositions A2 and B2 were extruded at 200° C. by different extruders, they were extruded from the multi-layer molding T-die through the two-kind three-layer feed block. After the resin compositions A2 and B2 were layered one upon another in such a way that a film thickness ratio of A2/B2/A2 after they were stretched was 2/1/2, they were solidified by cooling them with the casting roll having a temperature of 127° C. to obtain a laminated unporous membrane material.

The laminated unporous membrane material was subjected to the sequential biaxial stretching to stretch it 5.0 times longer than its original length in the MD at 90° C. and thereafter 2.5 times longer than its original length in the TD at 90° C. Thereafter the laminated unporous membrane material was subjected to the heat relaxation by 22% at 125° C. to obtain a laminated porous film.

Example 4

After the resin compositions A1 and B1 were layered one upon another in a manner similar to that of the example 1, they were solidified by cooling them with the casting roll having a temperature of 127° C. to obtain a laminated unporous membrane material.

After the laminated unporous membrane material was subjected to the sequential biaxial stretching to stretch it 5.4 times longer than its original length in the MD at 95° C. and 2.5 times longer than its original length in the TD at 95° C., the laminated unporous membrane material was subjected to the heat relaxation by 22% at 125° C. to obtain a laminated porous film.

Example 5

0.1 parts by mass of the 3,9-bis[4-(N-cyclohexylcarbamoyl)phenyl]-2,4,8,10-tetraoxaspiro[5.5]undecane serving as the β crystal nucleating agent and 0.2 parts by mass of an antioxidant (IRGANOX-B255, produced by Chiba Specialty Chemicals, Inc.) were added to 100 parts by mass of the polypropylene resin ("Prime polypro" F300SV, MFR: 3 g/10 minutes, produced by Prime Polymer Corporation). The above-described three components were fused and kneaded at 280° C. by using the same-direction twin screw extruder (produced by Toshiba Machine Co., Ltd., diameter: φ40 mm, screw effective length L/D=32) to obtain a pelletized resin composition A3.

After the resin compositions A3 and B1 were extruded at 200° C. by different extruders, they were extruded from the multi-layer molding T-die through the two-kind three-layer feed block. After the resin compositions A3 and B1 were layered one upon another in such a way that a film thickness ratio of A3/B1/A3 after they were stretched was 2/1/2, they were solidified by cooling them with the casting roll having a temperature of 127° C. to obtain a laminated unporous membrane material.

The laminated unporous membrane material was subjected to the sequential biaxial stretching to stretch it 4.3 times longer than its original length in the MD at 95° C. and thereafter 2.5 times longer than its original length in the TD at 95° C. Thereafter the laminated unporous membrane material was subjected to the heat relaxation by 22% at 125° C. to obtain a laminated porous film.

Example 6

0.2 parts by mass of the 3,9-bis[4-(N-cyclohexylcarbamoyl)phenyl]-2,4,8,10-tetraoxaspiro[5.5]undecane serving as the β crystal nucleating agent and 0.2 parts by mass of the antioxidant (IRGANOX-B255 produced by Chiba Specialty Chemicals, Inc.)) were added to 100 parts by mass of the polypropylene resin ("Prime polypro" F300SV, MFR: 3 g/10 minutes, produced by Prime Polymer Corporation). The above-described three components were fused and kneaded at 280° C. by using the same-direction twin screw extruder (diameter: φ40 mm, screw effective length L/D=32, produced by Toshiba Machine Co., Ltd.) to obtain a pelletized resin composition A5.

10 parts by mass of microcrystalline wax (Hi-Mic 1090 produced by Nippon Seiro Co., Ltd.) was added to 90 parts by mass of the high-density polyethylene (Hi-Zex3300F produced by Prime Polymer Corporation, density: 0.950 g/cm³, MFR: 1.1 g/10 minutes) serving as the polyethylene resin. The above-described two components were fused and kneaded at 200° C. by using the same-direction twin screw extruder (produced by Toshiba Machine Co., Ltd., diameter: 035 mm, screw effective length L/D=32) to obtain a pelletized resin composition B4.

After the resin compositions A5 and B4 were layered one upon another in a manner similar to that of the example 1, they were solidified by cooling them with the casting roll having a temperature of 125° C. to obtain a laminated unporous membrane material.

After the laminated unporous membrane material was subjected to the sequential biaxial stretching to stretch it 4.5 times longer than its original length in the MD at 110° C. and 2.4 times longer than its original length in the TD at 110° C., the laminated unporous membrane material was subjected to the heat relaxation by 15% at 125° C. to obtain a laminated porous film.

Example 7

After the resin compositions A5 and B4 were layered one upon another in a manner similar to that of the example 1, they were solidified by cooling them with the casting roll having a temperature of 125° C. to obtain a laminated unporous membrane material.

After the laminated unporous membrane material was subjected to the sequential biaxial stretching to stretch it 5.0 times longer than its original length in the MD at 110° C. and 2.4 times longer than its original length in the TD at 110° C., the laminated unporous membrane material was subjected to the heat relaxation by 8% at 125° C. to obtain a laminated porous film.

Comparison Example 1

0.2 parts by mass of the 3,9-bis[4-(N-cyclohexylcarbamoyl)phenyl]-2,4,8,10-tetraoxaspiro[5.5]undecane serving as the β crystal nucleating agent and 0.2 parts by mass of the antioxidant (IRGANOX-B255, produced by Chiba Specialty Chemicals, Inc.) were added to 100 parts by mass of the polypropylene resin ("Prime polypro" F300SV, MFR: 3 g/10 minutes, produced by Prime Polymer Corporation). The above-described three components were fused and kneaded at 280° C. by using the same-direction twin screw extruder (diameter: φ40 mm, screw effective length L/D=32, produced by Toshiba Machine Co., Ltd.) to obtain a pelletized resin composition A4.

20 parts by mass of the microcrystalline wax (Hi-Mic 1090 produced by Nippon Seiro Co., Ltd.) was added to 80 parts by mass of the high-density polyethylene (Hi-Zex3300F produced by Prime Polymer Corporation, density: 0.950 g/cm³, MFR: 1.1 g/10 minutes) serving as the polyethylene resin. The above-described two components were fused and kneaded at 200° C. by using the same-direction twin screw extruder (produced by Toshiba Machine Co., Ltd., diameter: φ35 mm, screw effective length L/D=32) to obtain a pelletized resin composition B3.

After the resin compositions A4 and B3 were extruded at 200° C. by different extruders, they were extruded from the multi-layer molding T-die through the two-kind three-layer feed block. After the resin compositions A4 and B3 were layered one upon another in such a way that a film thickness ratio of A4/B3/A4 after they were stretched was 3/1/3, they were solidified by cooling them with the casting roll having a temperature of 127° C. to obtain a laminated unporous membrane material.

The laminated unporous membrane material was subjected to the sequential biaxial stretching to stretch it 5.0 times longer than its original length in the MD at 90° C. and thereafter 2.5 times longer than its original length in the TD at 90° C. Thereafter the laminated unporous membrane material was subjected to the heat relaxation by 22% at 125° C. to obtain a laminated porous film.

Comparison Example 2

The polypropylene resin ("Prime polypro" F300SV, MFR: 3 g/10 minutes, produced by Prime Polymer Corporation) and the high-density polyethylene (Hi-Zex3300F produced by Prime Polymer Corporation, density: 0.950 g/cm$^3$, MFR: 1.1 g/10 minutes) used as the polyethylene resin were so extruded by different extruders that the polypropylene resin forms the outermost layer and that the high-density polyethylene forms the intermediate layer. They were extruded from the multi-layer molding T-die through the two-kind three-layer feed block. After they were layered one upon another in such a way that the thickness ratio thereof after they were stretched was 1/1/1, they were solidified by cooling them with the casting roll having a temperature of 100° C. to obtain a laminated unporous membrane material.

The laminated unporous membrane material was left for 24 hours in a hot air circulation oven heated to 120° C. for heat treatment. Thereafter the heat-treated laminated unporous membrane material was stretched 1.7 times longer than its original length in the MD at 25° C. and thereafter 2.0 times longer than its original length in the MD at 100° C. by a roll stretching machine. In this manner, a laminated porous film was obtained.

Comparison Example 3

After the resin compositions A5 and B4 were layered one upon another in a manner similar to that of the example 1, they were solidified by cooling them with the casting roll having a temperature of 125° C. to obtain a laminated unporous membrane material.

After the laminated unporous membrane material was subjected to the sequential biaxial stretching to stretch it 5.0 times longer than its original length in the MD at 110° C. and 2.2 times longer than its original length in the TD at 110° C., the laminated unporous membrane material was subjected to the heat relaxation by 15% at 125° C. to obtain a laminated porous film.

The production conditions of the porous films of the examples 1 through 7 are shown in table 1. The production conditions of the porous films of the comparison examples 1 through 3 are shown in table 2. The properties of the porous films of the examples 1 through 7 are shown in table 3. The properties of the porous films of the comparison examples 1 through 3 are shown in table 4.

(1) Ratio Among Layers

A section of each laminated porous film was cut to observe a cut piece with a scanning electron microscope (S-4500 produced by Hitachi, Ltd). The ratio among layers was measured from the layer structure of each film and the thickness thereof.

(2) Thickness

The in-plane thickness of each film was measured at unspecified 30 points with a dial gauge of $1/1000$ mm. The average of the measured thicknesses was set as the thickness of the film.

(3) Porosity

The porosity was obtained by measuring a substantial mass W1 of each laminated porous film and computing a mass W0 thereof when the porosity is 0% from the density and thickness of each resin composition. Based on the following equation, the porosity was computed from the values obtained in the above-described manner.

$$\text{Porosity (\%)} = \{(W0-W1)/W0\} \times 100$$

(4) Tensile Strength

In the measurement, a tension compression testing machine (produced by Intesuko Inc., 200X type) was used. Each specimen obtained by cutting the laminated porous film into a rectangle having a length of 80 mm and a width of 15 mm in a measuring direction was used. Both ends of each specimen in its longitudinal direction were chucked by setting the distance between both ends to 40 mm. The specimens were pulled at a cross head speed of 200 mm/minute. A stress at a broken point was recorded as a tensile strength. The measurement was made five times, and the average of the measured values of each specimen was computed.

The tensile strength of each specimen measured in the MD was expressed as $T_{MD}$, whereas the tensile strength thereof measured in the TD was expressed as $T_{TD}$.

(5) Air Permeability

The air permeability (second/100 ml) of each specimen was measured in an air atmosphere having a temperature of 25° C. in accordance with JIS P8117. A digital Oken-type air permeability measuring apparatus (produced by Asahi Seiko Co., Ltd.) was used to measure the air permeability thereof.

(6) Measurement of Air Permeability after Heating at 135° C. for 5 Seconds)

Figure 2A:
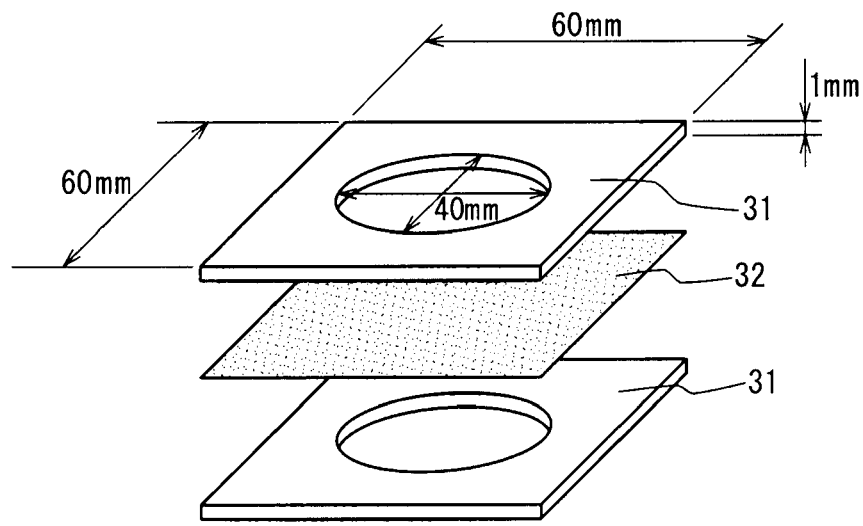
FIGS. 2(A) and 2(B) are an explanatory view for explaining a film-fixing method in measuring the air permeability of a laminated porous film after the laminated porous film is heated at 135° C. for five seconds and in wide-angle X-ray diffraction measurement.

Each laminated porous film was cut squarely in a dimension of 60 mm (vertical length)×60 mm (horizontal length). As shown in FIG. 2(A), each laminated porous film was sandwiched between two aluminum plates, (material: JIS A5052, size: 60 mm (vertical length)×60 mm (horizontal length)×1 mm (thickness)), where a circular hole having a diameter of φ40 mm was formed at a central portion. As shown in 2(B), the periphery of the laminated porous film was fixed with a clip (double clip "Christo-J35" produced by Kokuyo Co., Ltd.). Thereafter the laminated porous film fixed with the two aluminum plates was immersed in an oil bath, (OB-200A produced by Azuwan Inc.) at a central portion, which had a temperature of 135° C. Glycerin (first class produced by Nakarai Desk Co., Ltd.) was filled in the oil bath up to 100 mm from the bottom surface. The glycerin was heated for five seconds. Immediately after the heating of the glycerin finished, the laminated porous film was immersed for five minutes in a cooling bath in which separately prepared glycerin having a temperature of 25° C. was filled. After the laminated porous film was cleaned with 2-propanol (high grade produced by Nakarai Desk Co., Ltd.) and acetone (high grade produced by Nakarai Desk Co., Ltd.), the film was dried for 15 minutes in an air atmosphere having a temperature of 25° C. The air permeability of the dried laminated porous film was measured in accordance with the method used in the above-described (5).

(7) Tear Strength

The tear strength of each specimen was measured in accordance with JIS K7128-1. The tear strength of the specimen measured in the MD which was a slit direction was $H_{MD}$, and the tear strength thereof measured in the TD which was the slit direction was $H_{TD}$.

(8) Tensile Modulus of Elasticity of Specimen Stretched by 3%

In the measurement, a tension compression testing machine (produced by Intesuko Inc., 200X type) was used. Each specimen used was obtained by cutting the laminated porous film in a length of 200 mm in the MD and a width of 5 mm in the TD. The specimen was pulled in conditions where the distance between chucks was 150 mm and the cross head speed was 5 mm/minute. Based on a load applied to a load cell when the distance between the chucks was stretched by 3%, the tensile modulus of elasticity when the distance between the chucks was stretched by 3% was found from the following equation. The average of measured values of three positions of each specimen was computed to obtain the thickness thereof:

Tensile modulus of elasticity (MPa)=[load (kg)×9.8 (m/s$^2$)]/stretched distance (mm)]/sectional area (mm$^2$)×distance between chucks (mm)

The average of values obtained at five points was set as the elastic modulus of elasticity.

The β activities of the obtained laminated porous films were evaluated as described below.

(9) Differential Scanning calorimetry (DSC)

By using a differential scanning calorimeter (DSC-7) produced by PerkinElmer Inc, each laminated porous film was heated from 25° C. up to 240° C. at a heating speed of 10° C./minute and held for one minute. Thereafter the film was cooled from 240° C. down to 25° C. at the cooling speed of 10° C./minute and held for one minute. Thereafter the film was heated again from 25° C. up to 240° C. at the heating speed of 10° C./minute and held for one minute. When the film was heated again, whether the β activity was present or not was evaluated as follows according to whether a peak was detected in the range of 145° C. to 160° C. which is the crystal melting peak temperature (Tmβ) derived from the β crystal of the polypropylene.

○: films in which Tmβ was detected in the range of 145° C. to 160° C. (β activity was generated).

x: films in which Tmβ was not detected in the range of 145° C. to 160° C. (β activity was not generated).

The β activity was measured in a nitrogen atmosphere. The amount of the specimen used in the measurement was 10 mg.

(10) Wide-Angle X-ray Diffraction Measurement

Figure 2B:
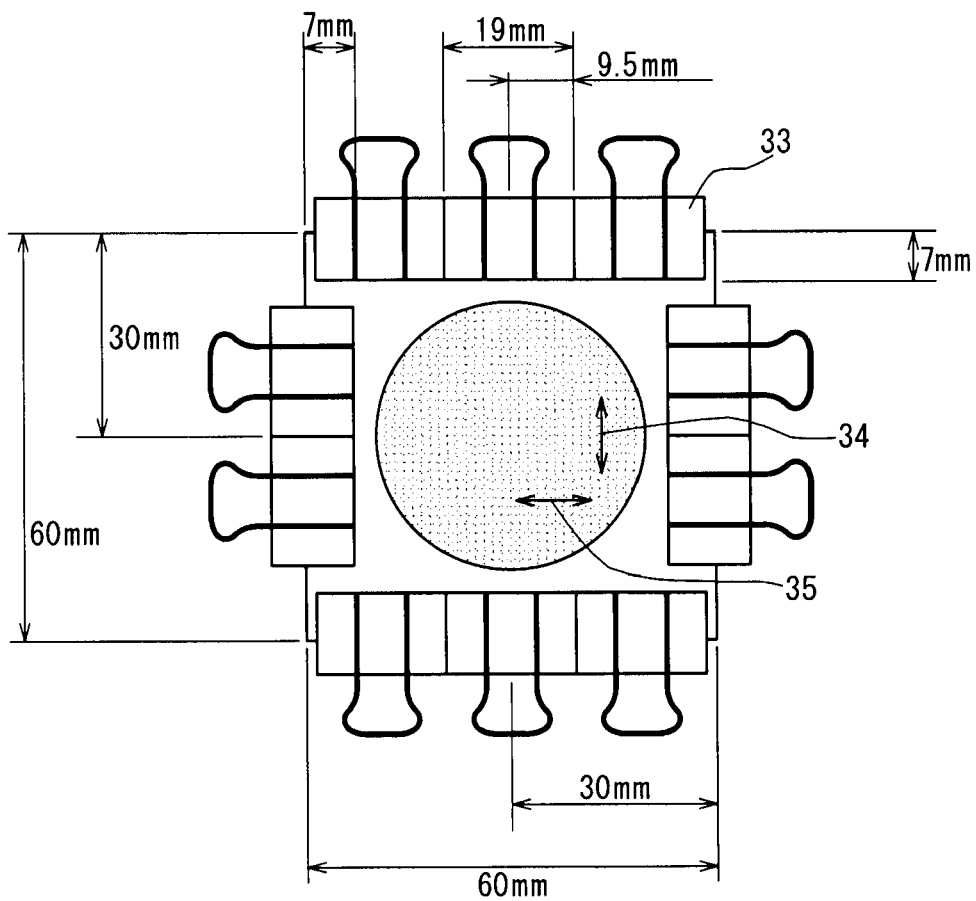

Each of the laminated porous films was cut squarely in the dimension of 60 mm (vertical length)×60 mm (horizontal length) and was fixed, as shown in FIGS. 2A and 2B.

Each of the films fixed to two aluminum plates was put in a blow isothermal instrument (Model: DKN602 produced by Yamato Science Corporation) having a set temperature of 180° C. and display temperature of 180° C. After each film was held therein for three minutes, the set temperature was altered to 100° C., and the film was gradually cooled to 100° C. for not less than 10 minutes. When the display temperature became 100° C., the film was taken out of the blow isothermal instrument. The film was cooled for five minutes in an atmosphere having a temperature of 25° C. with the film bound with the two aluminum plates. Thereafter wide-angle X-ray diffraction measurement was carried out on the film at the portion thereof set at the circular hole, of the aluminum plate, having the diameter of φ40 mm in the following measuring conditions.

Wide-angle X-ray diffraction measuring apparatus: Model Number: XMP18A produced by Mac science Co., Ltd.
X-ray source: CuK α-ray, output: 40 kV, 200 mA
Scanning method: 2θ/θ scan, 2θ range: 5° to 25°, scanning interval: 0.05°, scanning speed: 5°/minute The presence and nonpresence of the β activity was evaluated from a peak derived from the (300) surface of the β crystal of polypropylene.

○: Films in which the peak was detected in the range of 2θ=16.0° to 16.5° (film had β activity)

x: Films in which the peak was not detected in the range of 2θ=16.0° to 16.5° (film did not have β activity)

When the film cannot be cut in the dimension of 60 mm×60 mm, specimens may be prepared by setting the film at the circular hole, having the diameter of φ40 mm, which is disposed at the central portion of the aluminum plate.

(11) Test for Examining Resistance of Film to Tear when Film Contacts Projection The test was conducted by mounting a needle having a radius of curvature of 0.5 mm on a FUDOH Rheometer (J type produced by Leo Tech Co., Ltd.). A test of vertically pressing the needle against each film at a speed of 300 mm/minute was conducted five times. The number of times (n) in which each film was torn in the MD owing to contact between the film and the needle was recorded. Films to which marks other than x were given were evaluated as practical.

◉: Films which were not torn in the MD (n=0).

○: Films which were torn in the MD one or two times (n=1, 2).

Δ: Films which were torn in the MD three or four times (n=3, 4)

x: Films were torn five times (n=5).

TABLE 1

| | Item | Example1 | Example2 | Example3 | Example4 | Example5 | Example6 | Example7 |
|---|---|---|---|---|---|---|---|---|
| Layer A | F300SV | 100 | 100 | 40 | 40 | 100 | 100 | 100 |
| | D101 | | | 60 | 60 | | | |
| | MSN-100 | 0.1 | 0.1 | 0.1 | 0.1 | 0.1 | 0.2 | 0.2 |
| | B225 | | | | | 0.2 | 0.2 | 0.2 |
| Layer B | HZ3300F | 80 | 80 | 90 | 90 | 80 | 90 | 90 |
| | P115 | 20 | 20 | 10 | 10 | 20 | | |
| | Hi-Mic1090 | | | | | | 10 | 10 |
| Production condition | Casting roll temperature (° C.) | 127 | 127 | 127 | 127 | 127 | 125 | 125 |
| | Vertical stretching temperature (° C.) | 110 | 95 | 90 | 90 | 95 | 110 | 110 |
| | Vertical stretching ratio (times) | 3.8 | 4.3 | 5.0 | 5.4 | 4.3 | 4.5 | 5.0 |
| | Horizontal stretching temperature (° C.) | 105 | 95 | 90 | 95 | 95 | 110 | 110 |
| | Horizontal stretching ratio (times) | 2.5 | 2.5 | 2.5 | 2.5 | 2.5 | 2.4 | 2.4 |
| | Relaxation temperature (° C.) | 115 | 125 | 125 | 125 | 125 | 125 | 125 |
| | Relaxation rate (%) | 14 | 22 | 22 | 22 | 22 | 15 | 8 |

TABLE 2

| Item | Comparison Example 1 | Comparison Example 2 | Comparison Example 3 |
|---|---|---|---|
| Layer A | | | |
| F300SV | 100 | 100 | 100 |
| D101 | | | |
| MSN-100 | 0.2 | | 0.2 |
| B225 | 0.2 | | 0.2 |
| Layer B | | | |
| HZ3300F | 80 | 100 | 90 |
| P115 | | | |
| Hi-Mic1090 | 20 | | 10 |
| Production condition | | | |
| Casting roll temperature (° C.) | 127 | 100 | 125 |
| Vertical stretching temperature (° C.) | 93 | 25/100 | 110 |
| Vertical stretching ratio (times) | 3.6 | 1.7/2.0 | 5.0 |
| Horizontal stretching temperature (° C.) | 98 | — | 110 |
| Horizontal stretching ratio (times) | 2.6 | — | 2.2 |
| Relaxation temperature (° C.) | 125 | — | 125 |
| Relaxation rate (%) | 18 | — | 15 |

TABLE 3

| | | Example1 | Example2 | Example3 | Example4 | Example5 | Example6 | Example7 |
|---|---|---|---|---|---|---|---|---|
| Film thickness | μm | 27 | 27 | 25 | 25 | 20 | 22 | 22 |
| Ratio among layers | | — | 2/1/2 | 2/1/2 | 2/1/2 | 2/1/2 | 2/1/2 | 2/1/2 |
| Air permeability at 25° C. | Second/100 ml | 500 | 355 | 580 | 400 | 460 | 663 | 404 |
| Air permeability after heating for five seconds at 135° C. | Second/100 ml | >99999 | >99999 | 31000 | 27000 | >99999 | >99999 | >99999 |
| Porosity | % | 56 | 47 | 59 | 59 | 59 | 50 | 51 |
| Tensile modulus of elasticity when stretched by 3% | MPa | 607 | 598 | 765 | 882 | 589 | 853 | 840 |
| Tear strength $H_{MD}$ | N/cm | 12 | 18 | 6 | 5 | 7 | 6 | 7 |
| $H_{TD}$ | N/cm | 61 | 50 | 49 | 44 | 49 | 57 | 74 |
| $H_{MD}/H_{TD}$ | — | 0.19 | 0.36 | 0.12 | 0.10 | 0.15 | 0.11 | 0.088 |
| Tensile strength $T_{MD}$ | MPa | 94 | 95 | 118 | 140 | 99 | 113 | 124 |
| $T_{TD}$ | MPa | 39 | 41 | 37 | 32 | 47 | 36 | 35 |
| $T_{MD}/T_{TD}$ | — | 2.4 | 2.3 | 3.2 | 4.4 | 2.1 | 3.1 | 3.5 |
| Test for examining resistance of film to tear when film contacts projection | — | ◎ | ○ | △ | △ | ◎ | △ | △ |
| DSC | — | ○ | ○ | ○ | ○ | ○ | ○ | ○ |
| Wide-angle X-ray-diffraction | — | ○ | ○ | ○ | ○ | ○ | ○ | ○ |
| Overall evaluation | — | ◎ | ◎ | ○ | ○ | ◎ | ○ | ○ |

TABLE 4

| | | Comparison Example 1 | Comparison Example 2 | Comparison Example 3 |
|---|---|---|---|---|
| Film thickness | μm | 22 | 25 | 22 |
| Ratio among layers | | 3/1/3 | 1/1/1 | 2/1/2 |
| Air permeability at 25° C | Second/100 ml | 900 | 518 | 607 |
| Air permeability after heating for five seconds at 135° C. | Second/100 ml | >99999 | >99999 | >99999 |
| Porosity | % | 46 | 38 | 50 |
| Tensile modulus of elasticity when stretched by 3% | MPa | 469 | 805 | 1004 |
| Tear strength $H_{MD}$ | N/cm | 8 | 4 | 6 |
| $H_{TD}$ | N/cm | 163 | 63 | 79 |
| $H_{MD}/H_{TD}$ | — | 0.05 | 0.07 | 0.078 |
| Tensile strength $T_{MD}$ | MPa | 89 | 176 | 90 |
| $T_{TD}$ | MPa | 50 | 15 | 32 |
| $T_{MD}/T_{TD}$ | — | 1.8 | 11.7 | 2.8 |
| Test for examining resistance of film to tear when film contacts projection | — | x | x | x |
| DSC | — | ○ | x | ○ |
| Wide-angle X-ray diffraction | — | ○ | x | ○ |
| Overall evaluation | — | x | x | x |

Tables indicate that the laminated porous films of the examples constructed in the range of the values of the ratio $H_{MD}/H_{TD}$ specified in the present invention had mechanical properties balanced more favorably than the films of the comparison examples constructed out of the values of the range $H_{MD}/H_{TD}$ specified in the present invention.

On the other hand, the laminated porous films of the comparison examples constructed out of the range of the values of the range $H_{MD}/H_{TD}$ specified in the present invention had anisotropy in a particular direction. Thus the laminated porous films of the comparison examples were liable to tear in secondary processing. The laminated porous film which are liable to be torn are liable to become unstable in its configuration or broken in cutting it in a specific configuration by a Thomson-type cutter to use it as the separator of a button battery.

It has been found that the laminated porous films of the examples 1, 2, and 5 are more favorable than those of the other examples from the test conducted to examine the resistance thereof to tear when they contact the projection.

The laminated porous film of the second invention is described below.

The laminated porous film of the second invention has a property characterized in that the temperature and thermal shrinkage factor thereof in the flow direction at a production time and that in the direction orthogonal to the flow direction are balanced favorably. On the other hand, the laminated porous film of the first invention has the property characterized in its tear strength. Thus in this respect, the second invention is different from the first invention. The difference between the second invention and the first invention is attributed to the difference between the stretching ratio and stretching temperature or the relaxation condition in the biaxial stretching specified in the first invention and those specified in the second invention.

Therefore the fundamental structure of the laminated porous film of the second invention, namely, the structure of the layer A, the β crystal nucleating agent to be contained in the layer A, the structure of the layer B, the compound (X) to be contained in the layer B to accelerate the formation of pores, the lamination structure such as the ratio between the thickness of the layer A and that of the layer B are similar to those of the laminated porous film of the first invention. Except the stretching ratio in the biaxial stretching, the method of the second invention for producing the laminated porous film is also similar to that of the first invention. Further similarly to the first invention, the lithium battery is assembled by using the laminated porous film of the second invention as the separator thereof. Therefore detailed description of the structure of the laminated porous film of the second invention and the like similar to that of the laminated porous film of the first invention is omitted herein. The laminated porous film of the second invention is described below on matters different from those of the first invention.

[Description of Property of Laminated Porous Film]

The laminated porous film of the second invention is so constructed as to display the SD property equivalent to that to be displayed by the first invention. In addition the laminated porous film of the second invention is also characterized in that it displays the BD property at not less than 160° C. That is, the BD temperature of the laminated porous film of the second invention is set to not less than 160° C., favorably not less than 180° C., and more favorably not less than 200° C. When the BD temperature of the laminated porous film of the second invention is less than 160° C., there is no difference between the SD temperature and the BD temperature. For example, when the laminated porous film of the present invention is used as the separator of the lithium-ion battery, it is impossible to provide the battery in which safety is sufficiently secured. Although the upper limit of the BD temperature of the laminated porous film of the second invention is not specified, the upper limit of the BD temperature thereof is set to preferably not more than 300° C. As a means for adjusting the BD temperature, a means for increasing the ratio of the thickness of the layer A is effective.

(Air Permeability at 25° C.)

Because the air permeability of the laminated porous film of the second invention at 25° C. and that after the laminated porous film is heated at 135° C. for five seconds are equivalent to those of the laminated porous film of the first invention, description of the air permeability of the laminated porous film of the second invention is omitted herein.

(Porosity)

The porosity of the laminated porous film of the second invention is set to be equivalent to that of the laminated porous film of the first invention. The porosity of the laminated porous film of the second invention is set to favorably not less than 15%, more favorably not less than 20%, most favorably not less than 30%, and especially favorably not less than 40%. On the other hand, as the upper limit of the porosity, the porosity is favorably set to not more than 80%, more favorably not more than 70%, and most favorably not more than 65%. When the porosity is more than 15%, the laminated porous film securely obtains sufficient intercommunicable performance and is thus excellent in its air-permeable property. When the porosity is less than 80%, the laminated porous film is capable of sufficiently holding the mechanical strength, which is preferable from the standpoint of handleability.

(Shrinkage Factor)

The laminated porous film of the second invention is characterized in that it has a well-balanced shrinkage factor.

As the upper limit of a shrinkage factor $S_{TD2}$ of the laminated porous film of the second invention in the TD at 105° C., it is important that the shrinkage factor $S_{TD2}$ thereof is set to not more than 10%. The shrinkage factor $S_{TD2}$ thereof is set to favorably not more than 9% and more favorably not more than 8%. When the shrinkage factor $S_{TD2}$ thereof in the TD at 105° C. is more than 10%, there is a fear that the laminated porous film is excessively tightly wound and wrinkled when the laminated porous film is dried in a wound state to use it as the separator of the lithium-ion battery. In addition, when the shrinkage factor $S_{TD2}$ thereof is high after the separator is wound together with the electrodes, the ends of electrodes are strongly pressed against the separator. As a result, the separator is liable to crack, and short circuit is liable to occur.

As the lower limit of the shrinkage factor $S_{TD2}$ of the laminated porous film, the shrinkage factor $S_{TD2}$ thereof is set to favorably not less than 2% and more favorably not less than 2.3%. In order for the laminated porous film to show the SD property, it is necessary for the laminated porous film to thermally shrink to some extent. Thus when the shrinkage factor $S_{TD2}$ thereof is not less than 2%, it is possible for the laminated porous film to have the SD property sufficiently.

As the lower limit of a shrinkage factor $S_{MD2}$ of the laminated porous film of the second invention at 105° C., the shrinkage factor $S_{MD2}$ thereof is set to favorably not more than 10%, more favorably not more than 8%, and most favorably not more than 6%. When the shrinkage factor $S_{MD2}$ thereof at 105° C. is more than 10%, the dimensional stability of the laminated porous film is unfavorable and thus there is a fear that it is wrinkled when the laminated porous film is dried and short circuit occurs inside the battery.

As the lower limit of the shrinkage factor $S_{MD2}$ of the laminated porous film of the second invention at 105° C., the shrinkage factor $S_{MD2}$ thereof at 105° C. is set to favorably not less than 0%. When the shrinkage factor $S_{MD2}$ thereof at 105° C. is less than 0%, i.e., when the laminated porous film expands, it slips out of position and is wrinkled and bent when it is stored in a wound state, which is unpreferable.

The ratio $S_{MD2}/S_{TD2}$, namely, the ratio of the shrinkage factor $S_{MD2}$ of the laminated porous film in the MD at 105° C. to the shrinkage factor $S_{TD2}$ thereof in the TD at 105° C. is set to not more than 3.0 as the upper limit thereof, favorably not more than 2.5, and most favorably not more than 2.0. The ratio $S_{MD2}/S_{TD2}$ is set to not less than 0.1 as the lower limit thereof, favorably not less than 0.3, and more favorably not less than 0.5.

For dimensional stability of the laminated porous film, it is preferable that the laminated porous film has a low shrinkage factor in the MD and the TD. In order for the laminated porous film to display the SD property, it is necessary that the laminated porous film thermally shrinks to some tent and has the shrinkage factor as isotropic as possible in each direction.

When the ratio $S_{MD2}/S_{TD2}$ is less than 0.1, the shrinkage factor thereof in the TD is too high, whereas when the ratio $S_{MD2}/S_{TD2}$ is larger than 3.0, the shrinkage factor thereof in the MD is too high. In both cases, the anisotropy is large, which is unpreferable.

The shrinkage factor $S_{TD1}$ of the laminated porous film of the present invention at 40° C. is set to favorably to less than 1%, more favorably less than 0.9%, and most favorably less than 0.8%. When the shrinkage factor $S_{TD1}$ thereof at 40° C. is not less than 1%, the laminated porous film deforms during transport and storage. Thus it is difficult to handle the laminated porous film as a product.

As the lower limit of the shrinkage factor $S_{TD1}$ of the laminated porous film at 40° C., the shrinkage factor $S_{TD1}$ thereof is set to favorably not less than 0%. When the shrinkage factor $S_{TD1}$ thereof at 40° C. is less than 0%, i.e., when the laminated porous film expands, it shifts out of position and is wrinkled and bent when it is stored in a wound state, which is unpreferable.

The shrinkage factor $S_{MD1}$ of the laminated porous film of the present invention at 40° C. is set to favorably to less than 1%, more favorably less than 0.9%, and most favorably less than 0.8%. When the shrinkage factor $S_{MD1}$ at 40° C. is not less than 1%, the laminated porous film deforms during transport and storage. Thus it is difficult to handle the laminated porous film as a product.

As the lower limit of the shrinkage factor $S_{MD1}$ of the laminated porous film at 40° C., the shrinkage factor $S_{MD1}$ thereof is set to favorably not less than 0%. When the shrinkage factor $S_{MD1}$ thereof at 40° C. is less than 0%, i.e., when the laminated porous film expands, it shifts out of position and is wrinkled and bent when it is stored in a wound state, which is unpreferable.

The shrinkage factor $S_{TD3}$ of the laminated porous film of the present invention in the TD at 150° C. is set to not more than 25% and more favorably not more than 23%. When the shrinkage factor $S_{TD3}$ thereof at 150° C. is more than 25%, the electrodes separated from each other by the separator contact each other, and short circuit occurs when the laminated porous film is used as the separator of the lithium-ion battery.

As the lower limit of the shrinkage factor $S_{TD3}$ thereof at 150° C., the shrinkage factor $S_{TD3}$ thereof is set to preferably not less than 0%. When the shrinkage factor $S_{TD3}$ thereof is less than 0%, i.e., when the laminated porous film expands, it shifts out of position and is wrinkled and bent when it is stored in a wound state, which is unpreferable.

The shrinkage factor $S_{MD3}$ of the laminated porous film of the present invention in the MD at 150° C. is set to favorably not more than 18% and more favorably not more than 15%. When the shrinkage factor $S_{MD3}$ thereof at 150° C. is more than 18%, the separator is excessively tightly wound together with electrodes when the laminated porous film is used as the separator of the lithium-ion battery and thus there is a fear that short circuit occurs.

As the lower limit of the shrinkage factor $S_{MD3}$ thereof at 150° C., the shrinkage factor $S_{MD3}$ thereof is set to preferably not less than 0%. When the shrinkage factor $S_{MD3}$ thereof at 150° C. is less than 0%, i.e., when the laminated porous film expands, it shifts out of position and is wrinkled and bent when it is stored in a wound state, which is unpreferable.

As one means for effectively decreasing the shrinkage factor of the laminated porous film, a method of decreasing the stretching ratio is known. But when the stretching ratio is decreased, various properties of the laminated porous film, for example, the strength and modulus of elasticity thereof necessary in using it as the separator of the lithium-ion battery deteriorate. When the laminated porous film of the present invention is used as the separator of the lithium-ion battery, it is desirable that the laminated porous film has a high tensile modulus of elasticity in the MD to prevent the laminated porous film and the electrodes from being excessively tightly wound because the separator and the electrodes are wound together by applying a high tension thereto in the MD. At this time, the tensile modulus of elasticity thereof in the MD is favorably not less than 500 MPa and more favorably 700 MPa.

Thereafter the obtained laminated unporous membrane material is biaxially stretched. Simultaneous biaxial stretching or sequential biaxial stretching may be used. In forming the laminated porous film superior in its SD property intended by the present invention, it is possible to select a stretching condition at each stretching step. In the present invention, the sequential biaxial stretching capable of easily controlling the porous structure is preferable. Stretching in the membrane material pick-up direction (MD) (flow direction) is called the "vertical stretching", whereas stretching in the direction (TD) vertical to the MD is called "horizontal stretching".

In using the sequential biaxial stretching, although it is necessary to select a stretching temperature according to the composition, crystal melting peak temperature, and crystallization degree of a resin composition to be used, the sequential biaxial stretching allows the porous structure to be controlled easily and physical properties of the laminated porous film such as its mechanical strength and shrinkage factor to be easily balanced. The stretching condition and the relaxation condition are key factors greatly affecting the performance of the laminated porous film.

The stretching temperature in the vertical stretching is controlled in a range of 0 to 135° C. and favorably 10 to 130° C. It is possible to vertically stretch the laminated porous film at one stage at a certain temperature or at a multistage at different temperatures. The vertical stretching ratio is set to favorably 2 to 10, more favorably 3 to 8, and most favorably 4 to 7. By vertically stretching the laminated porous film in the above-described range, it is possible to suppress breakage at a stretching time and generate a proper starting point of pores. When the vertical stretching ratio is low, it is impossible to sufficiently obtain the starting point of pores, and breakage occurs while the horizontal stretching operation is being performed.

The stretching temperature in the horizontal stretching is set to favorably not less than 80° C. and more favorably not less than 90° C. As the upper limit of the stretching temperature in the horizontal stretching, the stretching temperature is set to favorably not more than 150° C. and more favorably not more than 140° C. The horizontal stretching ratio is set to favorably not less than 1.1, more favorably not less than 1.2, and most favorably not less than 1.4. As the upper limit of the horizontal stretching ratio, the horizontal stretching ratio is set to not more than 10, favorably not more than 8, and most favorably not more than 7. By performing the horizontal stretching in the above-described range, it is possible to moderately enlarge the starting point of pores formed by the vertical stretching, generate a fine porous structure and in addition obtain sufficient dimensional stability and shrinkage factor $S_{TD2}$, which is preferable. The stretching speed at the horizontal stretching step is set to favorably 500 to 12000%/minute, more favorably 1500 to 10000%/minute, and most favorably 2500 to 8000%/minute.

The laminated porous film obtained in the above-described manner is heat-treated at favorably 100 to 150° C. and more favorably at 110 to 140° C. to improve the dimensional stability thereof. Relaxation treatment may be performed as necessary. The relaxation rate in the horizontal direction is set to favorably not less than 1%, more favorably not less than 5%, and most favorably not less than 16%. As the upper limit of the relaxation rate in the horizontal direction, the relaxation rate is set to favorably not more than 25% and more favorably not more than 22%. By setting the relaxation rate in the horizontal direction to not less than 1%, the laminated porous film is allowed to have a sufficient dimensional stability, which is preferable. By setting the relaxation rate in the horizontal direction to not more than 25%, the laminated porous film is allowed to sufficiently obtain a shrinkage factor $S_{TD2}$, which is preferable. By uniformly cooling the laminated porous film after the heat treatment is carried out and thereafter winding it, the laminated porous film of the present invention is obtained.

Description of Examples

The second embodiment and comparison examples are shown below to describe the laminated porous film of the present invention in detail below. The present invention is not limited thereto.

Example 8

0.2 parts by mass of an antioxidant (IRGANOX-B255 produced by Chiba Specialty Chemicals, Inc.) and 0.2 parts by mass of N,N'-dicyclohexyl-2,6-naphthalenedicarboxylic acid amide serving as the β crystal nucleating agent were added to 100 parts by mass of the polypropylene resin ("Prime polypro" F300SV, MFR: 3 g/10 minutes, produced by Prime Polymer Corporation). The above-described three components were fused and kneaded at 270° C. by using the same-direction twin screw extruder (diameter: φ40 mm, L/D=32) produced by Toshiba Machine Co., Ltd.) to obtain a pelletized resin composition A1.

20 parts by mass of microcrystalline wax (Hi-Mic 1090 produced by Nippon Seiro Co., Ltd.) and 0.2 parts by weight of dibenzylidene sorbitol (GEL ALL D produced by New Japan Science Ltd.) serving as the nucleating agent were added to 80 parts by mass of the high-density polyethylene (Hi-Zex3300F produced by Prime Polymer Corporation, density: 0.950 g/cm$^3$, MFR: 1.1 g/10 minutes) serving as the polyethylene resin. The above-described three components were fused and kneaded at 230° C. by using the same-direction twin screw extruder to obtain a pelletized resin composition B1.

After the resin compositions A1 and B1 were extruded at 200° C. by different extruders, they were co-extruded from the multi-layer molding T-die through the two-kind three-layer feed block. After the resin compositions A1 and B1 were layered one upon another in such a way that a film thickness ratio of A1/B1/A1 after they were stretched was 3/1/3, they were solidified by cooling them with the casting roll having a temperature of 125° C. to obtain a laminated unporous membrane material having a thickness of 80 μm.

The laminated unporous membrane material was subjected to sequential biaxial stretching to stretch it five times longer than its original length in the MD at 110° C. and thereafter 2.4 times longer than its original length in the TD at 110° C. Thereafter the laminated unporous membrane material was subjected to heat relaxation by 22% at 125° C. to obtain a laminated porous film.

Various properties of the obtained laminated porous film were measured and evaluated. Table 5 shows the results.

Example 9

After the resin compositions A1 and B1 were layered one upon another similarly to the example 8, they were solidified by cooling them with the casting roll having a temperature of 130° C. to obtain a laminated unporous membrane material having a thickness of 80 μm.

The laminated unporous membrane material was subjected to the sequential biaxial stretching to stretch it 3.6 times longer than its original length in the MD at 93° C. and thereafter 2.6 times longer than its original length in the TD at 98° C. Thereafter the laminated unporous membrane material was subjected to heat relaxation by 18% at 125° C. to obtain a laminated porous film.

Various properties of the obtained laminated porous film were measured and evaluated. Table 5 shows the results.

Example 10

After the resin compositions A1 and B1 were extruded at 200° C. by different extruders, they were co-extruded from the multi-layer molding T-die through the two-kind three-layer feed block. After the resin compositions A1 and B1 were layered one upon another in such a way that a film thickness ratio of A1/B1/A1 after they were stretched was 3/1/3, they were solidified by cooling them with the casting roll having a temperature of 129° C. to obtain a laminated unporous membrane material having a thickness of 80 μm.

The laminated unporous membrane material was subjected to sequential biaxial stretching to stretch it 1.7 times longer than its original length in the MD at 40° C. and thereafter 3.2 times longer than its original length in the TD at 120° C. Thereafter the laminated unporous membrane material was subjected to heat relaxation by 19% at 125° C. to obtain a laminated porous film.

Various properties of the obtained laminated porous film were measured and evaluated. Table 5 shows the results.

Comparison Example 4

After the resin compositions A1 and B1 were layered one upon another similarly to the example 8, they were solidified by cooling them with the casting roll having a temperature of 131° C. to obtain a laminated unporous membrane material having a thickness of 80 μm.

The laminated unporous membrane material was subjected to the sequential biaxial stretching to stretch it 3.6 times longer than its original length in the MD at 98° C. and thereafter two times longer than its original length in the TD at 108° C. Thereafter the laminated unporous membrane material was subjected to heat relaxation by 19% at 125° C. to obtain a laminated porous film.

Various properties of the obtained laminated porous film were measured and evaluated. Table 6 shows the results.

Comparison Example 5

Except that the stretching ratio was set to 2.2, and thereafter the laminated unporous membrane material was relaxed by 15% at 125° C., a laminated porous film was obtained in a manner similar to that of the example 8.

Various properties of the obtained laminated porous film were measured and evaluated. Table 6 shows the results.

Comparison Example 6

After the resin compositions A1 and B1 were extruded at 200° C. by different extruders, they were co-extruded from the multi-layer molding T-die through the two-kind three-layer feed block. After the resin compositions A1 and B1 were layered one upon another in such a way that a film thickness ratio of A1/B1/A1 after they were stretched was 3/1/3, they were solidified by cooling them with the casting roll having a temperature of 125° C. to obtain a laminated unporous membrane material having a thickness of 80 μm.

The laminated unporous membrane material was subjected to the sequential biaxial stretching to stretch it 4.5 times longer than its original length in the MD at 95° C. and thereafter 2.4 times longer than its original length in the TD at 110° C. Thereafter the laminated unporous membrane material was subjected to heat relaxation by 15% at 125° C. to obtain a laminated porous film.

Various properties of the obtained laminated porous film were measured and evaluated. Table 6 shows the results.

Various properties (1) through (11) of the films of the examples and those of the comparison examples shown in tables 5, 6 were measured and evaluated.

The measurement of (1) ratio between thicknesses of layers, (2) thickness, (3) porosity, (6) air permeability at 25° C., (7) air permeability after heating at 135° C. for five seconds, (8) tensile modulus of elasticity, (9) differential scanning calorimetry (DSC), and (10) wide-angle X-ray diffraction are made in manners similar to those made in the first invention. Thus the description thereof is omitted herein.

(4) Shrinkage Factor at 40° C. and 105° C.

A baking testing apparatus (DK-1M) produced by Daiei Kagaku Seiki Mfg. Co., Ltd. was used for the measurement.

Each laminated porous film was cut in a length of 150 mm in a measuring direction and in a length of 15 mm in a direction vertical to the measuring direction. Markers were drawn at intervals of 100 mm along the measuring direction. Thereafter the specimens were hung inside the preheated baking testing apparatus (DK-1M produced by Daiei Kagaku Seiki Mfg. Co., Ltd.). After the specimens were taken out one hour later and cooled down to a room temperature, the length between the markers of each specimen was measured by a metal scale. The change in the length between the markers before and after the baking testing apparatus was heated was set as the shrinkage factor.

(5) Shrinkage Factor at 150° C.

The baking testing apparatus (DK-1M) produced by Daiei Kagaku Seiki Mfg. Co., Ltd. was used for the measurement.

Each laminated porous film was cut in a size of 60 mm×60 mm. Markers were drawn at intervals of 50 mm×50 mm to obtain specimens. After each of the specimens was sandwiched between glass plates having an area of 100 mm×100 mm and a thickness of 5 mm, each of the specimens was put inside the preheated baking testing apparatus (DK-1M produced by Daiei Kagaku Seiki Mfg. Co., Ltd.). After each specimen was taken out one hour later and cooled down to a room temperature with each specimen being sandwiched between the glass plates, the length between the markers of each specimen was measured by the metal scale. The change in the length between the markers before and after the baking testing apparatus was heated was set as the shrinkage factor.

(11) Molecular Orientation Ratio

By using the wide-angle X-ray diffraction measurement (diffractometer method), the strength distribution in the circumferential direction (azimuth ($\beta$) direction) of a diffraction peak of a (−113) plane observed in the neighborhood of $2\theta=41°$ was measured in the following measuring condition.

Wide-angle X-ray diffraction measuring apparatus: model number XMP18A produced by MAC Science Co., Ltd.

X-ray source: CuK α-ray

Output: 40 kV, 20 mA $2\theta/\theta$ measurement: $2\theta$ range: 35° to 55°, scan interval: 0.05°, scan speed: 1.5°/minute Measurement of orientation: $2\theta=41°$ (fixed), $\beta$ measuring range: 0 to 180°, 0.5° step scan speed: 1.5°/minute Optical system: pinhole optical system (2 mmφ) produced by Rigaku Corporation Goniometer: RINT200 vertical goniometer Detector: scintillation counter Diffusion slit: 2 mmφ, 1°

Light-receiving slit: 4 mmφ

Scattering slit: 1 mmφ

Measuring method: reflection method

Specimen base: multi-purpose specimen base for pole

1. After films were cut after the directions thereof were made even and layered one upon another in such a way that the total thickness thereof was about 1 mm, edges of the films were fixed to each other with an adhesive agent to use them for measurement.

2. Initially $\beta=0°$ was fixed in the TD. $2\theta/\theta$ scanning was performed in the above-described condition. Thereafter each specimen and the position of a counter were fixed at $\theta$ and $2\theta$ where the apex of a peak in the neighborhood of $2\theta=41°$ was disposed. Thereafter each specimen was scanned in the $\beta$ direction in the above-described condition to obtain a desired X-ray intensity distribution.

3. By using the profile of the obtained $\beta$ direction, a vertical integrated intensity ($O_{MD}$) and a horizontal intensity ($O_{TD}$) were found by the following method.

3-1. Smoothing was automatically performed by a weighted average method of a data diffraction program in the $\beta$ range of 0 to 180° to draw a base line passing through the lowest intensity.

3-2. As the area of a portion surrounded with the base line and an X-ray intensity curve in the range of $\beta$ shown below, the integrated intensity ($O_{MD}$) and the horizontal intensity ($O_{TD}$) were found: $O_{MD}$: $45 \leq \beta 135°$, $O_{TD}$: $0 \leq \beta \leq 45°$ and $135 \leq \beta \leq 180°$ 3-3. A ratio $O_{MD}/O_{TD}$ was computed from the above to set an obtained value as the scale of an orientation balance of a crystal chain in a film plane.

TABLE 5

|  |  |  | Example8 | Example9 | Example10 |
|---|---|---|---|---|---|
| Production condition | Ratio among layers | — | 3/1/3 | 3/1/3 | 3/1/3 |
|  | Casting temperature | ° C. | 125 | 130 | 129 |
|  | MD temperature | ° C. | 110 | 93 | 40/120 |
|  | MD ratio | ratio | 5.0 | 3.6 | 5.4 |
|  | TD temperature | ° C. | 110 | 98 | 98 |
|  | TD ratio | ratio | 2.4 | 2.6 | 2.3 |
|  | Relaxation temperature | ° C. | 125 | 125 | 125 |
|  | Relaxation rate | % | 22 | 18 | 19 |

TABLE 5-continued

|  |  |  | | Example8 | Example9 | Example10 |
|---|---|---|---|---|---|---|
| Properties | Thickness | | μm | 24 | 22 | 16 |
| | Shrinkage factor (MD) | $S_{MD1}$ | % | 0.3 | 0.6 | 0.5 |
| | | $S_{MD2}$ | | 3.6 | 6.0 | 4.0 |
| | | $S_{MD3}$ | | 13.7 | 17.9 | 17 |
| | Shrinkage factor (TD) | $S_{TD1}$ | % | 0.7 | 0.2 | 0.9 |
| | | $S_{TD2}$ | | 7.1 | 3.2 | 9.0 |
| | | $S_{TD3}$ | | 22.7 | 12.3 | 21 |
| | $S_{MD2}/S_{TD2}$ | | — | 0.5 | 1.9 | 0.4 |
| | Porosity | | % | 58 | 49 | 43 |
| | Air permeability at 25° C. | | Second/100 ml | 869 | 900 | 714 |
| | Air permeability after heating for five seconds at 135° C. | | Second/100 ml | >99999 | >99999 | >99999 |
| | Molecular orientation $O_{MD}/O_{TD}$ | | — | 7.0 | 2.8 | 7.1 |
| | Tensile modulus of elasticit | | MPa | 895 | 469 | 951 |
| | β activity | DSC | — | ○ | ○ | ○ |
| | | X-ray diffraction | — | ○ | ○ | ○ |
| | Overall evaluation | | — | ◎ | ○ | ◎ |

TABLE 6

|  |  | | Comparison Example 4 | Comparison Example 5 | Comparison Example 6 |
|---|---|---|---|---|---|
| Production condition | | | | | |
| Ratio among layers | | — | 3/1/3 | 3/1/3 | 3/1/3 |
| Casting temperature | | ° C. | 131 | 125 | 125 |
| MD temperature | | ° C. | 98 | 110 | 95 |
| MD ratio | | ratio | 3.6 | 5.0 | 4.5 |
| TD temperature | | ° C. | 108 | 110 | 110 |
| TD ratio | | ratio | 2.0 | 2.2 | 2.4 |
| Relaxation temperature | | ° C. | 125 | 125 | 125 |
| Relaxation rate | | % | 19 | 15 | 15 |
| Properties | | | | | |
| Thickness | | μm | 20 | 23 | 17 |
| Shrinkage factor (MD) | $S_{MD1}$ | % | 0.6 | 0.2 | 0.4 |
| | $S_{MD2}$ | | 6.5 | 3.4 | 5.0 |
| | $S_{MD3}$ | | 20.4 | 13.3 | 17.5 |
| Shrinkage factor (TD) | $S_{TD1}$ | % | 0.6 | 2.9 | 2.6 |
| | $S_{TD2}$ | | 1.9 | 13.1 | 12.0 |
| | $S_{TD3}$ | | 16.2 | 23.1 | 27.5 |
| $S_{MD2}/S_{TD2}$ | | — | 3.4 | 0.3 | 0.4 |
| Porosity | | % | 60 | 48 | 45 |
| Air permeability at 25° C. | | Second/100 ml | 520 | 607 | 589 |
| Air permeability after heating for five seconds at 135° C. | | Second/100 ml | 37747 | >99999 | 55363 |
| Molecular orientation $O_{MD}/O_{TD}$ | | — | 2.2 | 7.4 | 6.8 |
| Tensile modulus of elasticit | | MPa | 497 | 861 | 862 |
| β activity | DSC | — | ○ | ○ | ○ |
| | X-ray diffraction | — | ○ | ○ | ○ |
| Overall evaluation | | — | x | x | x |

Table 5 and 6 show the production conditions and physical property values of the laminated porous films of the examples and comparison examples.

Table 5 and 6 indicate that the laminated porous films of the examples 8 through 10 composed in the range specified in the present invention have dimensional stability and SD property superior to those of the films of the comparison examples composed out of the range specified in the present invention.

On the other hand, when the value of the shrinkage factor ratio $S_{MD2}/S_{TD2}$ is high, the laminated porous film does not display the SD property as indicated by the results of the comparison example 4. Even though the laminated porous film displays the SD property, it has an insufficient dimensional stability and a battery has a safety problem such as an internal short circuit, as indicated by the results of the comparison example 5.

From the standpoint of the tensile modulus of elasticity, the laminated porous films of the examples 8 and 10 are more favorable than those of the other examples.

INDUSTRIAL APPLICABILITY

Because the laminated film of the present invention is excellent in its dimensional stability and SD property and high in its air-permeable property, the laminated film can be utilized as packing supplies, hygiene products, livestock supplies, agricultural supplies, building supplies, medical supplies, separation films, light-diffusing plates, reflective sheets, and separators of batteries and particularly as the separator of the lithium-ion battery to be utilized as the power source of various electronics.

| EXPLANATION OF REFERENCE NUMERALS AND SYMBOLS | |
|---|---|
| 10: | separator for battery |
| 20: | lithium-ion battery |
| 21: | positive plate |
| 22: | negative plate |
| 31: | aluminum plate |
| 32: | film |
| 33: | clip |
| 34: | vertical direction of film |
| 35: | horizontal direction of film |

What is claimed is:

1. A laminated porous film, comprising:
   a layer A comprising a polypropylene resin as a main component thereof; and
   a layer B comprising a polyethylene resin,
   wherein the laminated porous film has a β activity, and
   wherein a ratio ($H_{MD}/H_{TD}$) of a tear strength ($H_{MD}$) in a flow direction (MD) of the laminated porous film to a tear strength ($H_{TD}$) in a direction (TD) perpendicular to the flow direction (MD) is 0.08 to 2.0.

2. The film of claim 1, wherein the tear strength $H_{MD}$ is not less than 4.5 N/cm.

3. The film of claim 1, wherein a ratio ($T_{MD}/T_{TD}$) of a tensile strength ($T_{MD}$) in a flow direction (MD) of the laminated porous film to a tensile strength ($T_{TD}$) in a direction (TD) perpendicular to the flow direction (MD) is 0.5 to 10.

4. The film of claim 3, wherein the tensile strength $T_{TD}$ is not less than 30 MPa.

5. The film of claim 1, wherein, when the film is stretched by 3% in a flow direction (MD) thereof, a tensile modulus of elasticity is not less than 500 MPa.

6. A laminated porous film, comprising:
a layer A comprising a polypropylene resin as a main component thereof; and
a layer B comprising a polyethylene resin,
wherein the laminated porous film has a β activity,
wherein when the laminated porous film is heated at 105° C. for one hour in a direction (TD) perpendicular to a flow direction (MD) of the laminated porous film, a shrinkage factor $S_{TD2}$ is not more than 10%; and
when the laminated porous film is heated at 105° C. for one hour in the flow direction (MD) and in the direction (TD) perpendicular to the flow direction, a ratio of a shrinkage factor $S_{MD2}$ in the flow direction (MD) to a shrinkage factor $S_{TD2}$ in the direction (TD) perpendicular to the flow direction (MD) is 0.1 to 3.0.

7. The film of claim 6, wherein, when the film is heated at 40° C. for one hour in the direction (TD) perpendicular to the flow direction (MD), a shrinkage factor $S_{TD1}$ is less than 1%.

8. The film of claim 6, wherein, when the film is heated at 150° C. for one hour in the direction (TD) perpendicular to the flow direction (MD), a shrinkage factor $S_{TD3}$ is not more than 25%.

9. The film of claim 6, wherein, when the film is heated at 40° C. for one hour in the flow direction (MD), a shrinkage factor $S_{MD1}$ is less than 1%, and
wherein, when the film is heated at 105° C. for one hour in the flow direction (MD), a shrinkage factor $S_{MD2}$ is not more than 10%.

10. The film of claim 6, wherein, when the film is heated at 105° C. for one hour in the flow direction (MD), a shrinkage factor $S_{MD3}$ is not more than 18%.

11. The film of claim 6, wherein a ratio of a molecular orientation $O_{MD}$ found from a wide-angle X-ray diffraction measurement in the flow direction (MD) to a molecular orientation $O_{TD}$ found from the wide-angle X-ray diffraction measurement in the direction (TD) perpendicular to the flow direction (MD) is not less than five.

12. The film of claim 1, wherein, the layer B further comprises at least one member selected from the group consisting of a modified polyolefin resin, an alicyclic saturated hydrocarbon resin, a modified alicyclic saturated hydrocarbon substance, an ethylene copolymer, and a wax.

13. The film of claim 1, having a porosity of 15 to 80%.

14. The film of claim 1, having an air permeability at 25° C. of 10 to 1000 seconds/100 ml,
wherein the air permeability is not less than 10000 seconds/100 ml when the laminated porous film is heated at 135° C. for five seconds.

15. A separator for a lithium-ion battery, comprising the laminated porous film of claim 1.

16. A battery, comprising the separator for a lithium-ion battery of claim 15, incorporated therein.

17. The film of claim 6, wherein, the layer B further comprises at least one member selected from the group consisting of modified polyolefin resin, alicyclic saturated hydrocarbon resin, a modified alicyclic saturated hydrocarbon substance, an ethylene copolymer, and wax.

18. The film of claim 6, having an air permeability at 25° C. of 10 to 1000 seconds/100 ml,
wherein the air permeability is not less than 10000 seconds/100 ml when the laminated porous film is heated at 135° C. for five seconds.

19. A separator for a lithium-ion battery, comprising the laminated porous film of claim 6.

20. A battery, comprising the separator for a lithium-ion battery of claim 19, incorporated therein.

* * * * *